US010848214B2

(12) United States Patent
Kakishima et al.

(10) Patent No.: US 10,848,214 B2
(45) Date of Patent: Nov. 24, 2020

(54) MECHANISM AND PROCEDURE OF BASE STATION SELECTION BASED ON UPLINK PILOT AND DISTRIBUTED USER-PROXIMITY DETECTION

(71) Applicant: NTT DOCOMO, INC., Tokyo (JP)

(72) Inventors: Yuichi Kakishima, Palo Alto, CA (US); Le Liu, Palo Alto, CA (US); Haralabos Papadopoulos, Palo Alto, CA (US); Ozgun Bursalioglu-Yilmaz, Palo Alto, CA (US); Chenwei Wang, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/091,910

(22) PCT Filed: May 5, 2017

(86) PCT No.: PCT/US2017/031386
§ 371 (c)(1),
(2) Date: Oct. 5, 2018

(87) PCT Pub. No.: WO2017/193056
PCT Pub. Date: Nov. 9, 2017

(65) Prior Publication Data
US 2019/0074876 A1   Mar. 7, 2019

Related U.S. Application Data

(60) Provisional application No. 62/352,951, filed on Jun. 21, 2016.

(51) Int. Cl.
*H04B 7/0417* (2017.01)
*H04B 7/0452* (2017.01)
(Continued)

(52) U.S. Cl.
CPC ............ *H04B 7/061* (2013.01); *H04B 7/0417* (2013.01); *H04B 7/0452* (2013.01); *H04L 5/005* (2013.01);
(Continued)

(58) Field of Classification Search
CPC . H04W 68/04; H04W 72/042; H04W 5/0051; H04L 5/0057
See application file for complete search history.

(56) References Cited

U.S. PATENT DOCUMENTS

2011/0249597 A1   10/2011   Papadopoulos
2014/0233407 A1   8/2014   Pourahmadi et al.
(Continued)

FOREIGN PATENT DOCUMENTS

WO   2013/055166 A1   4/2013
WO   2017/066681 A1   4/2017

OTHER PUBLICATIONS

Berger et al., "Application of compressive sensing to sparse channel estimation," IEEE Communications magazine, vol. 48, No. 11, Nov. 2010, 10 pages.
(Continued)

*Primary Examiner* — Iqbal Zaidi
(74) *Attorney, Agent, or Firm* — Womble Bond Dickinson (US) LLP

(57) ABSTRACT

A method and apparatus is disclosed herein for base station selection based on uplink pilot and distributed user-proximity detection. In one embodiment, the method comprises performing uplink pilot configuration for a plurality of user terminals over a set of common resource elements, including generating a plurality of pilot patterns for the plurality of user terminals, where each of the plurality of pilot patterns comprises at least one zero-power resource element and at least one non-zero-power resource element and at least one
(Continued)

zero-power resource element allocated to each different one of the plurality of user terminals has a different position in the pilot pattern.

30 Claims, 18 Drawing Sheets

(51) Int. Cl.
  *H04L 1/00* (2006.01)
  *H04B 7/06* (2006.01)
  *H04L 5/00* (2006.01)
  *H04L 27/26* (2006.01)

(52) U.S. Cl.
  CPC .......... *H04L 5/0007* (2013.01); *H04L 5/0021* (2013.01); *H04L 5/0035* (2013.01); *H04L 5/0048* (2013.01); *H04L 27/2613* (2013.01); *H04L 1/0026* (2013.01); *H04L 5/0051* (2013.01)

(56) References Cited

U.S. PATENT DOCUMENTS

| | | | | |
|---|---|---|---|---|
| 2015/0222347 | A1* | 8/2015 | Xia | H04B 7/024 370/329 |
| 2016/0072572 | A1* | 3/2016 | Kang | H04B 7/0417 370/329 |
| 2017/0195159 | A1* | 7/2017 | Lee | H04L 25/0224 |

OTHER PUBLICATIONS

Bethanabhotla et al., "Optimal user-cell association for massive MIMO wireless networks," submitted to IEEE Transactions on Wireless Communications, Jul. 2014, 40 pages.

Caire et al., "Multiuser MIMO achievable rates with downlink training and channel state feedback," IEEE Transactions on Information Theory, vol. 56, No. 6, 2010, 31 pages.

Dimic et al., "On Downlink Beamforming With Greedy User Selection: Performance Analysis and a Simple New Algorithm," IEEE Transactions on Signal Processing, vol. 53, No. 10, Oct. 2005, pp. 3857-3868.

Georgiadis et al., "Resource Allocation and cross-layer control in wireless networks," Foundations and Trends in Networking, vol. 1, No. 1, Apr. 2006, pp. 1-144.

Gopalakrishnan et al., "An analysis of pilot contamination on multi-user MIMO cellular systems with many antennas", 2011 IEEE 12th International Workshop on Signal Processing Advances in Wireless Communications (SPAWC 2011), Jun. 26, 2011, pp. 381-385.

Hoydis et al., "Massive MIMO in the UL/DL of cellular networks: How many antennas do we need?," IEEE Journal on Selected Areas in Communications, vol. 31, Feb. 2013, pp. 160-171.

Huh et al., "Achieving massive MIMO spectral efficiency with a not-so-large number of antennas," IEEE Transactions on Wireless Communications, Sep. 2012, pp. 3226-3239.

Huh et al., "Network MIMO with linear zero-forcing beamforming: large system analysis, impact of channel estimation and reduced-complexity scheduling," IEEE Transactions on Information Theory, May 2012, 54 pages.

International Preliminary Report on Patentability received for PCT Patent Application No. PCT/US2017/031386, dated Nov. 15, 2018, 9 pages.

International Search Report and Written Opinion received for PCT Patent Application No. PCT/US2017/031386, dated Aug. 4, 2017, 11 pages.

Marzetta, Thomas L., "Noncooperative cellular wireless with unlimited numbers of base station antennas," IEEE Transactions on Wireless Communications, vol. 9, Nov. 2010, pp. 3590-3600.

Sulyman et al., "Radio propagation path loss models for 5G cellular networks in the 28 GHz and 38 GHz millimeter-wave bands," IEEE communications Magazine, vol. 52, No. 9, Sep. 2014, pp. 78-86.

* cited by examiner

Macro-assisted RRH selection based on aggressive uplink pilots (M+l) pilot subcarriers are sparsely distributed over configured bandwidth $l=1$ pilot element index 1: non-zero-power pilot elements
0: zero-power pilot elements

| | $P_0$ | $P_1$ | $P_2$ | ... | $P_M$ |
|---|---|---|---|---|---|
| User terminal 1 | 0 | 1 | 1 | ... | 1 |
| User terminal 2 | 1 | 0 | 1 | ... | 1 |
| User terminal 3 | 1 | 1 | 0 | ... | 1 |
| ... | 1 | 1 | 1 | ... | 1 |
| User terminal $K_{max}$ | 1 | 1 | 1 | ... | 0 |

FIG. 8A $l=2$ pilot element index

1: non-zero-power pilot elements
0: zero-power pilot elements

| | $P_0$ | $P_1$ | $P_2$ | ... | $P_M$ |
|---|---|---|---|---|---|
| User terminal 1 | 0 | 0 | 1 | ... | 1 |
| User terminal 2 | 1 | 0 | 0 | ... | 1 |
| ... | ... | ... | ... | ... | ... |
| ... | 0 | 1 | 0 | ... | 1 |
| User terminal $K_{max}$ | 1 | 0 | 1 | ... | ... |

FIG. 8B

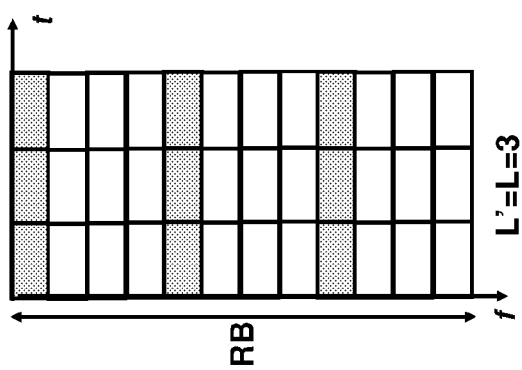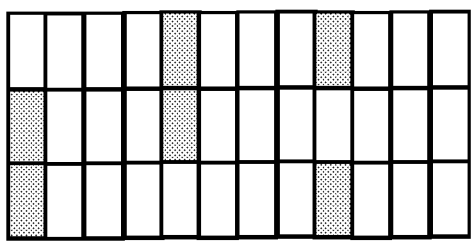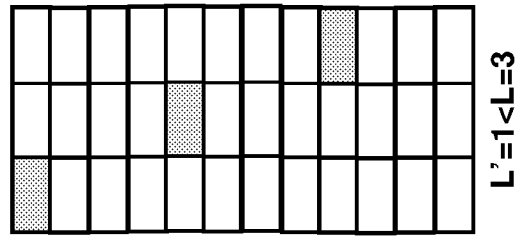
FIG. 10A

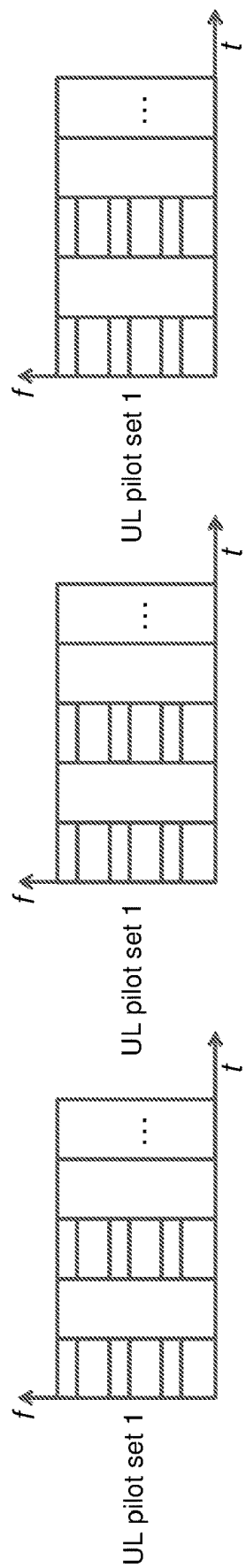
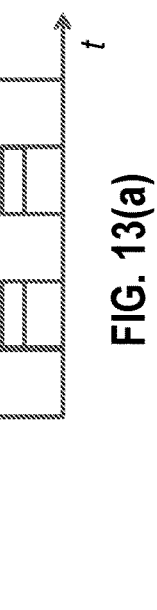
FIG. 13(a)  FIG. 13(b)  FIG. 13(c)

MECHANISM AND PROCEDURE OF BASE STATION SELECTION BASED ON UPLINK PILOT AND DISTRIBUTED USER-PROXIMITY DETECTION

CROSS-REFERENCE TO RELATED APPLICATIONS

This patent application is a U.S. National Phase application under 35 U.S.C. § 371 of International Application No. PCT/US2017/031386, filed May 5, 2017, entitled "MECHANISM AND PROCEDURE OF BASE STATION SELECTION BASED ON UPLINK PILOT AND DISTRIBUTED USER-PROXIMITY DETECTION" which claims priority to and incorporates by reference the corresponding U.S. provisional patent application No. 62/332,405, entitled, "MECHANISM AND PROCEDURE OF BASE STATION SELECTION BASED ON UPLINK PILOT AND DISTRIBUTED USER-PROXIMITY DETECTION", filed on May 5, 2016 and provisional patent application Ser. No. 62/352,951 entitled, "MECHANISM AND PROCEDURE OF BASE STATION SELECTION BASED ON UPLINK PILOT AND DISTRIBUTED USER-PROXIMITY DETECTION", filed Jun. 21, 2016.

BACKGROUND OF THE INVENTION

Dense cellular network deployments relying on the use of Massive Multiple-Input Multiple-Output (MIMO) technology are becoming very attractive candidates for future radio access technologies. This is partly due to the promise of Massive MIMO for providing very large throughput increases per base station (BS), due to its ability to multiplex a large number of high-rate streams over each transmission resource element.

It is well accepted by now that major gains in the physical (PHY) layer in terms of throughput per unit area are to come from the judicious use of dense infrastructure antenna deployments, that each comprises of a dense network of small cells, possibly equipped with large antenna arrays. Indeed, Massive MIMO is very attractive when it is used over dense (small cell) deployments, as, in principle, it can translate to massive throughput increases per unit area with respect to existing deployments.

Massive MIMO is also envisioned as a candidate for addressing large variations in user load, including effectively serving user-traffic hotspots, such as e.g., malls or overcrowded squares. A deployment option that is considered attractive for serving user-traffic hotspots involves remote radio-head (RRH) systems in which a base station (BS) controls a massive set of antennas that are distributed over many locations. Current proposals for RRH systems consider only one or at most a few antennas per RRH site. However, with bandwidth expected to become available at higher frequency bands (including in the mmWave band), it will become possible to space antenna elements far closer to one another and consider RRHs with possibly a large number of antennas per RRH site. In principle, this would allow the network to simultaneously harvest densification and large-antenna array benefits, thereby delivering large spectral efficiencies per unit area.

Channel state information (CSI) between each BS antenna and the user terminals is required in order to be able to serve multiple streams over the same transmission resources. CSI is obtained by the use of training pilots. A pilot is transmitted by one antenna and received by another allows learning the channel between the two antennas. With massive arrays at the BS side, one preferred option (in terms of its training overheads) for training is to train in the uplink, as one pilot from a user terminal antenna trains all the antennas at nearby BS sites, no matter how many sites and antennas per site. This is true not only for transmitting data in the uplink but also for downlink transmission. By using uplink (UL) training and exploiting uplink-downlink radio channel reciprocity, "Massive MIMO" rates can be achieved in the downlink (DL), provided UL training and DL massive MIMO data transmission are within the coherence time and bandwidth of the wireless propagation channel.

Furthermore, reciprocity based training inherently enables coordinated multipoint (CoMP) transmission, including RRH based transmission. Indeed, inherently, a single pilot broadcast from a user terminal antenna trains all the antennas at all nearby BS sites that can receive the pilot at sufficiently high power. It is well known that in cellular networks such CoMP transmission is beneficial for users at the cell edge, i.e., for users that receive equally strong signals from more than one BS. Similar performance gains are expected in RRH systems. Inherently a user can obtain beamforming gains during the data transmission phase from all the RRH site-antenna combinations that receive the user's pilot broadcast at sufficiently high power.

An important challenge that arises in harvesting densification benefits with cellular networks arises from the fact that UL pilot resources must be reused over the network. It is desirable to make the reuse distance of a pilot resource as small as possible in order to maximize the densification benefits and the delivered network spectral efficiency (and throughput) per unit area. Indeed, if the same pilot resource could be effectively reused by two close-by users, this would allow serving these two close-by users in parallel by the network. However, the users would have to be significantly separated (geographically), so that their simultaneously broadcasted pilots are received by their serving base-stations at sufficiently high powers, but at sufficiently low powers at each other user's BSs. This implies that there is a minimum reuse distance for a user's UL pilot that has to be honored so that users using the same pilot have to be significantly geographically separated to not cause interference to each other's BS.

A similar issue limits the throughputs per unit area achievable by RRH's. Indeed, it is conventionally assumed that a pilot resource is used by a single RRH (active) user. This limits the possible multiplexing gains offered by the RRH to serving a single user.

Although there several methods available in the literature for scheduling multi-user MIMO transmissions at the BS, a widely-accepted class of methods involves scheduling policies which, at any given scheduling instant at the BS, schedule the subset of users that would yield the highest expected weighted sum-rate. Each user's expected rate in each scheduled set for transmission is a function on the instantaneous channels of all the users in the scheduled set. Indeed, assuming linear zero-forced beamforming (LZFBF) transmission as described in the preceding section, at any given resource block the coefficients $\lambda_k$'s depend on the instantaneous channel matrix of all users in the scheduling set (served by LZFBF), and in particular, they can be expressed as $$\lambda_{k,S}(t) = \frac{1}{\left[\left(\vec{H}_{k,S}^H(t)\vec{H}_{k,S}(t)\right)^{-1}\right]_{k,k}},$$

where $\bar{H}_{k,S}(t)$ denote the compound downlink channel matrix for UT-k in the user set S at the $t^{th}$ resource block. Since the choice of the user set S and/or resource block (t) affects $\lambda_k$, the expected user rates are a function of both the scheduling set and the instantaneous channel realization. Fixing the scheduling time instance, and assuming LZFBF transmission, the problem of choosing the subset S that maximizes the weighted sum-rate is combinatorial in the number of antennas, as the number of possible subsets, S, that can be considered for scheduling grows exponentially fast with the maximum number of users that can be considered for joint scheduling. One proposed solution to this problem relies on a greedy algorithm for user set selection, with at most quadratic complexity.

Another important factor defining the scheduling assignments that are produced by the scheduling policy is the method by use of which the "user weights" are chosen at each scheduling instance prior to performing the weighted sum rate maximization operation. Although many methods exist for choosing these weights, a widely-accepted class of methods (because of their ability to result in nearly optimal performance with respect to a fairness criterion belonging to a broad class of fairness criteria) is one that relies on the use of "virtual queues" to determine the instantaneous user-weights in the weight-sum rate optimization.

Massive MIMO arrays at the BSs of a cellular network can substantially simplify scheduler operation. In sharp contrast to conventional MIMO, in many cases, the rate provided to an active (scheduled) user by its serving BS does not depend on the other active users in the same cell and in nearby cells and can be in fact predicted a priori. Such type of operation has been exploited over macro-cellular Massive MIMO deployments to obtain large cell and cell-edge throughput gains with respect to their conventional MIMO counterparts. This rate-hardening approach has been extended to include operation over heterogeneous networks comprising of macro and small cells with Massive MIMO arrays. Near optimal association and load balancing can be achieved with simple user-BS association mechanisms and rudimentary round-robin schedulers at each base station.

To achieve large cell throughputs and (especially) large cell-edge throughputs over well-planned macro-cellular networks with the simplified scheduling and precoding operation it is advocated that a reuse-7 operation is used. It is easy to show that in such a massive MIMO network the advocated operation is effectively equivalent to a reuse-1 operation with pilot-reuse 7, whereby the pilots are split into 7 subsets and each subset is reused every 7-th cell.

A pilot reuse extension of this approach over heterogeneous networks comprising of well-planned macro-cells and small cells has been proposed. In particular, pilot dimensions are split between macros and small cells. Furthermore, the individual tier pilot resources are reused with a given pilot reuse factor. For example, the small cell BSs are colored with a finite set of colors, so that no small cell has a same-color neighbor. The pilot reuse factor in this case corresponds to the number of used colors. Although, in theory this results in a minimum pilot-reuse of 4, as the minimum number of needed colors is 4, in practice, larger number of colors (and thus larger pilot reuse factors) are required.

A geographic scheduling approach exists where in each scheduling slot user terminals at similar locations (relative to their serving cell) are scheduled for transmission across the network. This allows optimizing the precoder, multiplexing gains and the pilot reuse independently per geographic location, i.e., independently for cell-center and cell-edge user terminals. With this operation, substantial gains may be harvested both in terms of cell and cell-edge throughput (as well as in terms of the number of antennas needed to achieve a certain level of performance). However, if a well-planned macro-cellular network with dense user traffic is used, geographic scheduling and optimization are possible. As a result, this approach cannot be directly used in unplanned small cell deployments.

Clearly, as higher band frequencies become available and wireless network become increasingly densified, there is a need for methods that allow translating antenna/site-densification into gains in spectral-efficiency per unit area. Although, for a well-planned macro-cellular network (in this case the antenna sites remain fixed and the number of antennas per site is increased), achieving similar gains with network densification (i.e., in cases where both the number of antennas/site and the number of sites also increase) is not possible with the current state of the art methods.

SUMMARY OF THE INVENTION

A method and apparatus is disclosed herein for base station selection based on uplink pilot and distributed user-proximity detection. In one embodiment, the method comprises performing uplink pilot configuration for a plurality of user terminals over a set of common resource elements, including generating a plurality of pilot patterns for the plurality of user terminals, where each of the plurality of pilot patterns comprises at least one zero-power resource element and at least one non-zero-power resource element and at least one zero-power resource element allocated to each different one of the plurality of user terminals has a different position in the pilot pattern.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 8A and B illustrate user terminals with non-orthogonal pilot codes with the zero-power and non-zero-power elements.

FIG. 10A illustrates more than one contiguous OFDM symbols for uplink sounding.

FIG. 13 illustrates UL pilot sets which may cover same subcarriers but are transmitted in different time slots, or on different subcarriers within same time slot, or even with a mixed type.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments disclosed herein include methods and apparatuses that allow for a much more aggressive pilot reuse in cellular and RRH systems in way that this aggressive pilot reuse translates into densification (throughput/unit area) gains. According to one embodiment, many potentially closely located users transmit appropriately coded pilots over the same transmission resources allocated for uplink pilot transmission. In the context of an RRH system, in one embodiment, appropriately designed user-specific pilot codes allow each RRH unit to determine whether the subset of transmitting active users (over the common uplink-pilot resource set) whose pilots are received at sufficiently high level comprises a single user, multiple users or no users. In the case that only a single user is received at sufficiently high level, the RRH also identifies the identity of the active user and estimates its channel By having the same coded packet available for transmission at each RRH, and by having each individual RRH unit transmit a user packet only when a single user is identified nearby (based on pilot code based user proximity detection), significant densification benefits can be harvested. Similar benefits can be harvested in dense small cell deployments, by pushing the same coded packet per user to all nearby small cell BSs, and having a small cell transmit a user packet only when the single-user is identified.

Herein, a class of methods and apparatuses are disclosed that allow increasing the network spectral efficiency per unit area in dense antenna/antenna-site network deployments. Methods disclosed rely on the combined use of appropriately designed pilot codes or reference signals (RSs) for use in the uplink by active (scheduled) user terminals, and mechanisms for fast user detection at each antenna-site by the network. The designed uplink pilots can be used for uplink sounding procedure for channel estimation as well as uplink random access procedure.

Figure 1A:
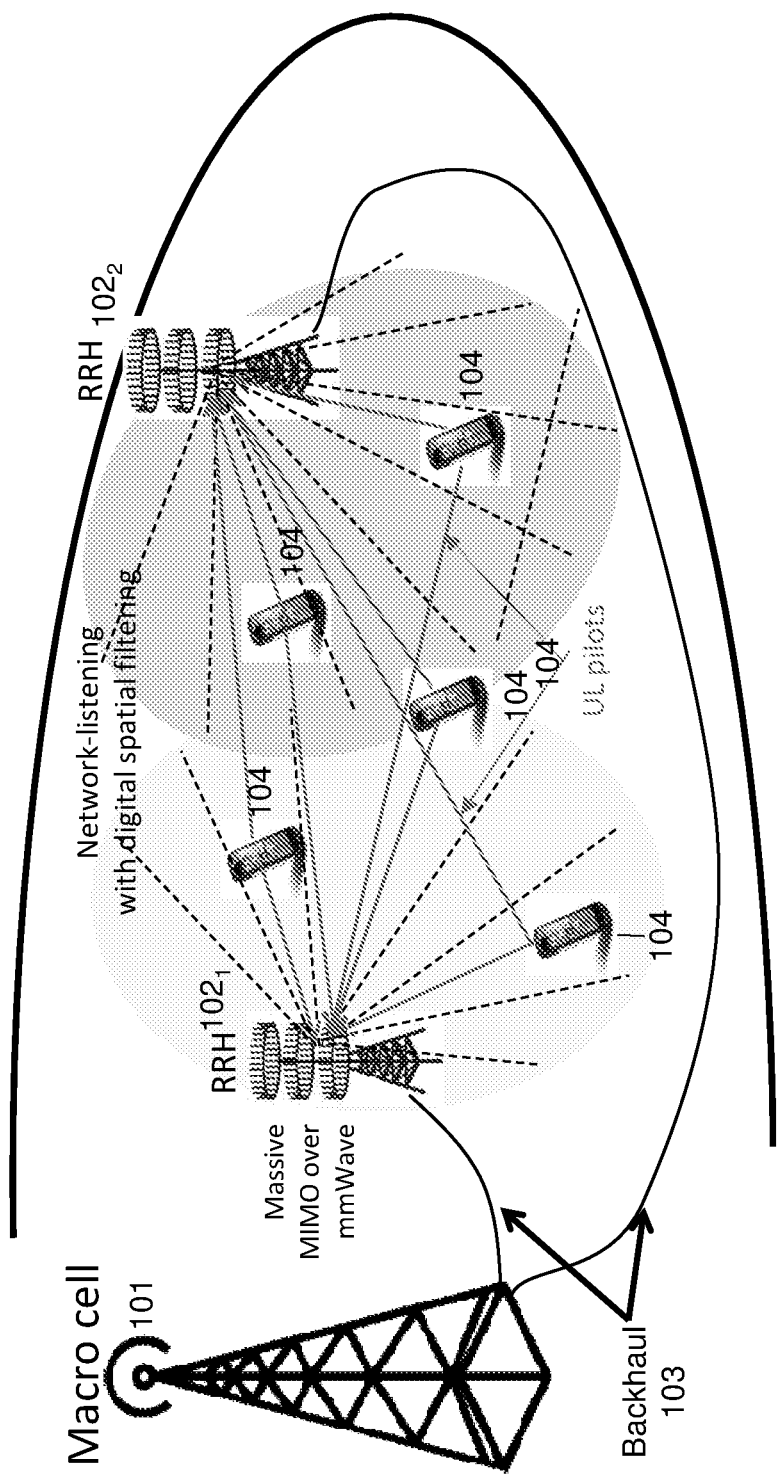
FIG. 1A illustrates UL RS transmission and network listening with digital spatial filtering.

Embodiments are disclosed involving a heterogeneous network, composed of large macro cells (or Base station, Nobe B, enhanced Node B) in combination with massive deployment of small cells, such as remote radio head (RRH) units, distributed antennas or femto cells, shown in FIGS. 1(a) and (b). Referring to FIG. 1(a), a central processor (CP) located in a Macro cell 101 and the RRHs 102 are connected to the CP by high-speed low-latency wire or wireless backhaul 103, such as, for example, optical fiber, X2 interface or E-band signals at 60 GHz. Small cells are primarily added to increase capacity in hot spots with high demand and to extend the cell-edge coverage of the macro network—both outdoors and indoors. They also improve network performance and service quality by offloading from the large macro cells. To facilitate the mobility of heterogeneous networks, in one embodiment, the control plane (C-plane) and user plane (U-plane) are a decoupled architecture, in which relatively crucial C-plane is expanded and kept at dependable lower frequency bands, such as conventional Long-Term Evolution (LTE) band, to guarantee the transmission reliability, while the corresponding U-plane is moved to available higher frequency bands, such as mmWave bands, to boost capacity. A mobile user terminal is associated with a macro cell and transmit/receive control signals on C-plane in a lower frequency band; while the U-plane data is transferred through the RRH(s), which is proximate to the user terminals.

In conventional network architecture, a physical cell ID is pre-assigned to each cell according to cell planning. The downlink cell-specific reference signals, by using this pre-assigned physical cell ID (PCI), are transmitted by each cell for user terminals to do the cell detection. Each user terminal selects the serving cell based on the received reference signal power (RSRP) and/or the received reference signal quality (RSRQ) according to one embodiment. However, it is omni-directional RS, which is neither flexible nor efficient for load balancing and spectrum reuse.

Here, mechanisms are disclosed where each RRH uses a higher carry frequency, such as mmWave bands, to enable the application of massive MIMO. In one embodiment, a large number of narrow beams per RRH will be configured to extend the limited coverage due to large mmWave attenuation and path loss. These configurable narrow beams are regarded as the virtual cells or sectors with flexible direction/coverage, adaptive to the user/traffic distribution.

Figure 1B:
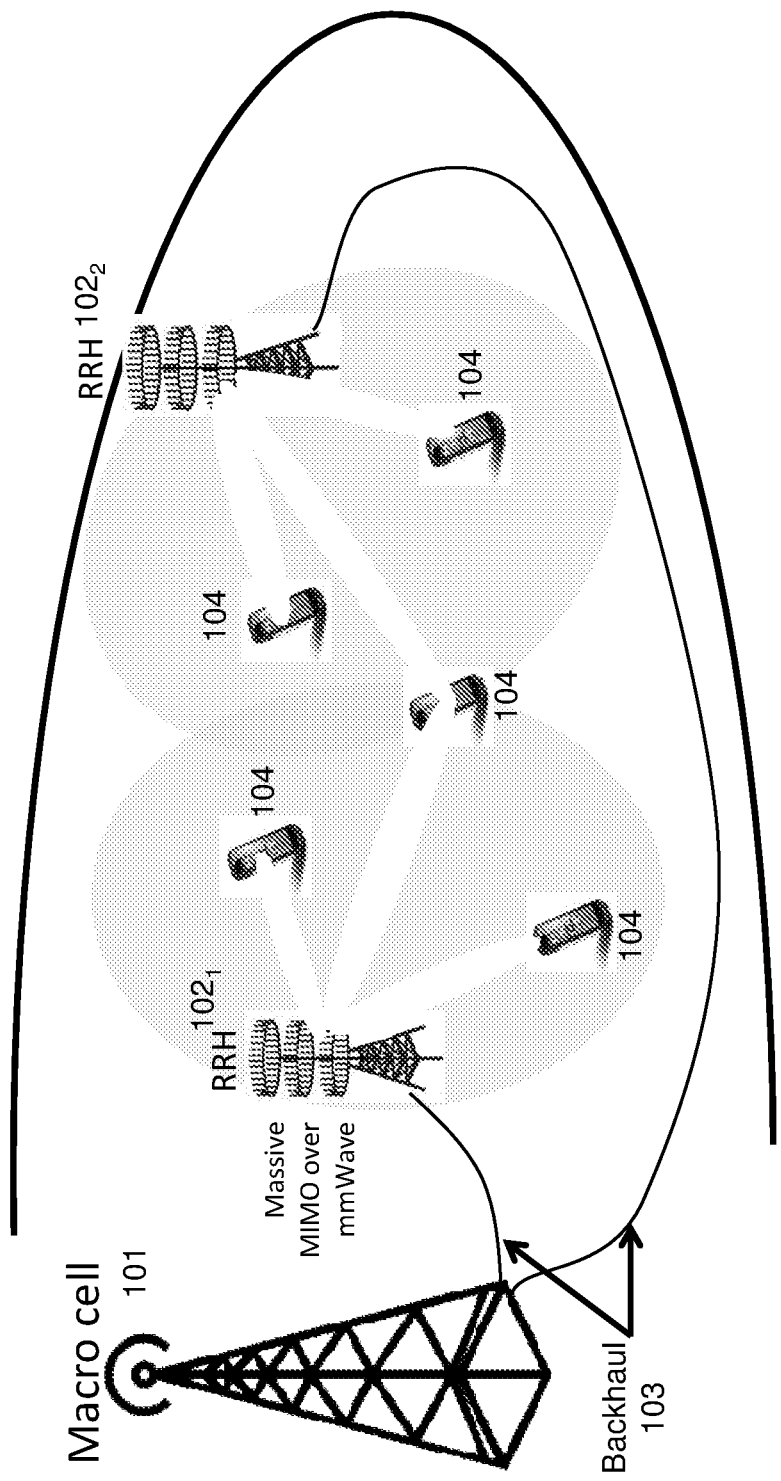
FIG. 1B illustrates virtual cells/sectors with beam directions adaptive to the proximate user terminals.

If the conventional cell detection is applied based on DL cell-specific RSs to the large number of virtual cells, it requires too complicated PCI-planning and the transmission of non-beamformed DL RS will result in significant interference and power wasting. Instead, it is proposed that the user detection at the RRH side be based on the network-listening of uplink RSs, as illustrated in FIG. 1(a) (UL pilot transmission and network listening with digital spatial filtering). Only if a user terminal is RRC-connected with the Macro cell, the center processor at the macro cell will assign and schedule the UL pilot transmission for user-proximity detection. After the user detection, the number of virtual cells as well as the cell beam direction/coverage at each RRH is configured according to the proximate users, as illustrated in FIG. 1(b) (virtual cells/sectors with beam directions adaptive to the proximate user terminals.

For a large number of user terminals within the Macro coverage, an aggressively reused pilot transmission with non-orthogonal pilot patterns over the common pilot resources is allocated for a group of user terminals to improve the multiplexing gain. The non-orthogonal pilot pattern is the combination of zero-power and non-zero power elements. By identifying the positions of zero-power elements based on the received uplink pilot signals, each RRH determines the user terminal(s) that are in proximity to it. The RRH selection is assisted by the CP coordination/management based on the energy detection results reported from RRHs. But the RRH selection procedure is transparent to the user terminal and even for the user terminals with mobility, without complicated handover and re-association between the RRH and the user terminal. In one embodiment, the UL pilot transmission of multiple user terminals is periodically transmitted. In another embodiment, the UL transmission is periodically triggered by using a DL control signal. The dense RRHs within the Macro coverage may need to send the DL synchronization signal, such as primary synchronization signal (PSS) and secondary synchronization signal (SSS), using the same temporary cell ID configured by the Macro cell, for simultaneous UL pilot transmission.

The above disclosed mechanisms of the user-specific cell configuration based on the UL pilot transmission can also be extended to more than one layer/dimension of cell configuration per user terminal taking variable quality of service (QoS) features into consideration. Nowadays it is very important to support QoS in telecommunication systems, considering the requirements that should be met when a service is provided. A goal of QoS is to provide priority, including dedicated bandwidth, controlled jitter and latency, and improved loss characteristics. On an intuitive level, QoS represents a certain type of requirements to be guaranteed to the users (e.g., how fast data can be transferred, how much the receiver has to wait, how correct the received data is likely to be, how much data is likely to be lost, etc.). The transmission of multi-type UL pilots per user terminal with different QoS-related parameters, such as levels of priority, rate/throughput, latency, power, user complexity, etc., can support the QoS-aware flow-specific cell configuration, for example, by allowing different maximum number of selected points. For the user with high-rate large-packet, such as, for example, video/audio streaming, multi-point transmission/reception may improve the data rate by making use of the spatial diversity and reduce the blockage probability, especially in mmWave bands, but the throughput increase may require the CSI measurement and scheduling coordination among multiple points, while for the user with low-rate small packets, such as some real-time and interactive traffic, voice over IP (VoIP) and virtual desktop infrastructure (VDI), single-point transmission/reception is efficient and simple and fast link adaptation is adaptive to the channel condition and error rate requirement. A user terminal may have mixed traffic with different QoS requirement, where the multiple sets of UL pilots are configured to enable the flexible QoS-specific cell configurations for this user terminal.

Although the disclosed mechanisms are described in the context of the macro-assisted RRH system, it can be readily applied in other related scenarios. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

A simple such embodiment considers synchronized (and jointly RF calibrated) small cells, low power nodes (LPNs), BSs, RRHs, co-located sectors with directional antennas per RRH site, virtual cells or sectors with different spatial filters per RRH site using large antenna arrays, femto cells or distributed antennas. The user terminals can also be any type of users, mobile terminals, devices, or user equipment's. Even for the unplanned deployment of small cells in the areas of high demand without RF planning, the user-centric mechanism is useful to let a small cell detect the uplink pilot transmission and identify the only active user terminals in its proximity. Another embodiment uses an additional step of choosing one of the small cells or more than one small cell in proximity semi-statically or dynamically. This embodiment does not require synchronization or joint RF calibration of nearby base stations.

Embodiments described herein have one or more of the following advantages with respect to the state-of-the-art network densification approaches:

1) The disclosed RRH-selection based on uplink pilot transmission is applied to a system with simplified management and maintenance, since conventional cell planning to pre-assign a physical cell ID for DL cell-specific RS transmission is used. Instead, the virtual sectors/cells with configurable beam direction are generated according to the user and traffic distribution and the cell ID is allocated after the user-proximity detection, which is a more flexible and user-friendly network configuration. It also avoids the transmission of conventional downlink cell-specific reference signal from dense RRHs for the sake of energy saving and interference reduction.
2) Embodiments allow a substantial increase in the spectral efficiency (and throughput) per unit area in hot spot areas by use of remote radio head (RRH) systems, or a network of large-scale MIMO small cells, with aggressive pilot reuse and fast (sub ms) user-proximity detection.
3) The techniques disclosed herein can be combined with the use of CoMP transmission, referred to as distributed MIMO, that requires sharing the RRC signaling for the configuration of the uplink pilot for active users among different RRH sites, but does not require channel state information exchange between RRHs.
4) Embodiments rely on having user terminals broadcast coordinated pilots over a set of concurrent resources to assist in detection of the user terminals in the proximity of a base station. No more RRM measurement/reporting from the user terminal side will save the battery and reduce the connection delay.
5) In one embodiment, the RRHs exploit spatial filtering (generalization of sectorization) together with user proximity to improve single-user proximity detection.
6) Other embodiments rely on the coordination between nearby RRHs to choose a single cell with configured beam direction semi-statically or dynamically for serving a user terminal among the ones that detected the user terminal in their proximity. The disclosed cell selection techniques can be combined with a broad range of scheduling and coordination schemes to improve the load balancing adaptive to the traffic and the user distribution.

7) The disclosed pilot-code based user-proximity detection technique can be also combined with a broad range of channel estimation algorithms based on uplink pilot transmission to allow enhancing the multiplexing gains achieved in a variety of wireless transmission scenarios over a broad range of carrier frequencies. In one embodiment, involving cellular transmission over mmWave channels, pilot codes are combined with pseudorandom pilot allocation over the OFDM plane and compressed sensing and channel estimation. Disclosed methods yield significant multiplexing gains in the number of user terminals that can be served simultaneously by the RRH system, realizing at the same time compressed-sensing gains in terms of the savings in the number of training dimensions per user that are required to estimate the channel of each user in proximity of an RRH unit.

The problems solved by one or more embodiments disclosed herein include the following:

1) Mechanisms and procedure for the management and control of the central processor (CP) at Macro eNB for the user terminals on the user multiplexing and time/frequency/spatial/power resource allocation based on aggressive non-orthogonal uplink pilot with zero/non-zero-power elements;
2) Mechanisms and procedure for the uplink pilot generation and transmission from the user terminals based on the uplink pilot configuration signaling from the CP;
3) Mechanisms and techniques for local user-proximity detection and status identification of a single user terminal in proximity, user collision or no proximate user by receiving and detecting the uplink pilots over the same resources at the RRH;
4) Mechanisms and procedure for the RRH selection and coordination of the CP among the RRHs based on the reported user-proximity detection results;
5) Mechanisms and procedure for the management and adjustment at the CP for the threshold used for the user-proximity detection at the RRHs;
6) Mechanisms and procedure for the management and adjustment at the CP for the transmit power control at the user terminals for power saving and interference control;
7) Mechanisms and procedure for the management and control at the CP for the user regrouping and the time/frequency/spatial/power resource re-allocation for the remaining user terminals based on the user-proximity detection results reported from the RRHs;
8) Mechanisms and procedure for the control and coordinated at the CP for the DL transmission from the selected RRH(s) to the user terminal in proximity; and
9) Mechanisms and procedure for the control and coordinated at the CP for the UL reception at the selected RRH(s) for the user terminal in proximity.

Further embodiments disclosed herein include methods and apparatuses for the user-proximity detection and identification based on uplink pilot transmission from a number of user terminals sharing a common set of pilot dimensions over a set of concurrent resources (or scheduling slots).

In one embodiment, the mechanism can be applied at each RRH site of a RRH system serving a hot spot area. Each RRH site determines which subset of user channels can be reliably estimated, and subsequently which user streams to transmit, including the beam on which to transmit each of these streams. By having available the packet for a user terminal for potential transmission at selected proximate RRH(s), each user terminal can be served provided at least one of these RRH sites is able to estimate the user channel and serve its packet. Embodiments rely on judiciously choosing: (a) the number of user terminals that use a common set of pilot dimensions across a set of concurrent resource blocks; (b) the pilot patterns used by these user terminals; (c) the mechanism for detecting whether multiple user terminals have collided at an RRH site, or a single user terminal is proximity; (d) the identity of the active user terminal in proximity at the RRH, provided a single user terminal is detected to be in proximity. As a result, densification can be achieved, in terms of increasing the number of user terminals simultaneously served by the RRH system on each set of pilot dimensions, translating in gains in spectral efficiencies achieved per unit area.

In principle, the same mechanism can be applied over a network of small cells with large arrays to achieve large gains in spectral efficiency delivered per unit area to serving mobile user terminals. In one embodiment, for a given user terminal and resource block (slot), each BS has the same user-specific packet available for transmission and transmits the packet if it detects the associated active user terminal is the only one in proximity among the ones transmitting on the same pilot dimension on the given slot. A variation of this mechanism involves fast coordination among nearby BSs that detect a given user terminal (as the single user in proximity among the ones using a common set of pilot dimensions) in order to select a single BS to serve that user terminal (among the BSs that detected the user) packet.

Embodiments enable an operator of a wireless network to serve very large numbers of user terminals in a hotspot area via a RRH system with many RRH sites and antenna elements per site. Embodiments allow user terminals using the same pilot resources to be served simultaneously by the RRH system. This allows network densification benefits to be realized together with large antenna arrays benefits, thereby enabling very large spectral efficiencies (and throughputs) per unit area. These deployments allow the network operator to substantially increase the provided throughput per unit area and can provide substantial improvements in user experience over hot spot areas.

Downlink MIMO and Channel State Information Acquisition

The text that follows provides a brief description of the general area of downlink MU-MIMO, and methods for obtaining the required channel state information at the transmitter, and rate calculations for Massive MIMO.

Conventional downlink MU-MIMO schemes have been at the forefront of investigations in the past decade. These schemes promise spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user streams so that each user terminal (UT) sees only its own stream. Given a base station with M transmit antennas, K single-antenna user terminals can be served simultaneously, giving roughly a multiplexing gain equal to min(M,K) with respect to a system serving a single terminal. In Massive MIMO, the number of antennas serving users is much larger than number of users. In downlink Massive MIMO, for instance, many users can be served at the same time either using linear zero-forced beamforming (LZFBF), or even the simpler Conjugate Beam Forming (CBF), exploiting the fact that the number of users served is far smaller than the number of antennas. As the number of antennas gets large, transmission beams get sharper, thereby achieving the desired received signal level with much lower transmitted power levels. Furthermore, with large antenna arrays, the achieved user rates harden, i.e. variance in user rate due to fast (e.g., Rayleigh) fading becomes effectively negligible.

For the transmitter to achieve this operation reliably the transmitter needs to have sufficiently accurate CSIT, i.e., the transmitter needs to know the channels between itself and each of the users sufficiently accurately. The techniques used for acquiring CSIT fall into two categories. The first class employs M pilots (one per base-station transmit antenna) in the downlink to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter by use of uplink transmissions to provide CSIT, i.e., CSI at the transmitting base-station. This class of CSIT acquisition schemes has two overheads: (i) a downlink pilot overhead, which scales linearly with M (the number of antenna elements at the transmitting base-station); (b) an uplink feedback overhead, responsible for making available to the base-station the channels between each user-terminal and each base-station antenna. In the case each user terminal has a single antenna, the uplink feedback is responsible for providing to the base-station the MK channel coefficients (complex-scalar numbers), one coefficient for each channel between each user terminal antenna and each base-station antenna. Although the uplink overhead could in principle be made to grow linearly with min(M,K), with the methods used in practice this overhead grows as the product of M and K. The downlink overhead limits the size of the antenna array, M, that can be deployed. Similarly, the uplink overheads limit both M and K, as the overheads grow very fast with respect to increasing M and K.

The second class of CSIT acquisition techniques is referred to as reciprocity-based training schemes. They exploit a property of the physical wireless channel, known as channel reciprocity to enable, under certain suitably chosen (M,K) pairs, very high-rate transmission with very efficient CSIT training. In particular, pilots are transmitted in the uplink by each user (K pilots are needed, but more could be used) and the corresponding pilot observations at the base-station are directly used to form the precoder for downlink transmission. If the uplink training and the following downlink data transmission happen close enough in time and frequency (within the coherence time and the coherence bandwidth of the channel), then the uplink training provides directly the required (downlink channel) CSI at the transmitter, since the uplink and the downlink channels at the same time and frequency are the same. In this class of techniques, the uplink overheads scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "Massive", without incurring any increase in the training overheads. Although with M>K, increasing M does not increase the number of simultaneously multiplexed streams, K, (i.e., K streams are simultaneously transmitted, one to each user), increasing M induces significant "beamforming" gains on each stream (which translate to higher rate per stream), at no additional cost in training. Alternatively, increasing M allows reducing the transmit power required to yield a target rate to a user terminal, thereby allowing for greener transmission schemes.

Consider the problem of enabling MU-MIMO transmission from an array of M transmit antennas to U single-antenna user terminals. The downlink (DL) channel between the i-th base-station transmitting antenna and the k-th user terminal is given by $$\vec{y}_{ki} = \vec{h}_{ki} \vec{x}_i + \vec{z}_{ki}$$

where $\vec{x}_i$, $\vec{h}_{ki}$, $\vec{y}_{ki}$, $\vec{z}_{ki}$ denote the transmitted signal from base-station antenna i, the compound DL channel between the two antennas, the observation and noise at the receiver of user terminal k, respectively. This model is applicable at any resource block. In general, the variables in the above equation are resource-block dependent. This dependency is currently ignored in the notation to avoid obscuring the teachings herein; it will be used when time-sharing across various resource blocks are considered. The amplitude and phase shifts introduced by RF-to-baseband conversion hardware (gain control, filters, mixers, A/D, etc.) at the receiver of user terminal k as well as the amplitude and phase shifts introduced by the baseband-to-RF conversion hardware (amplifiers filters, mixers, A/D, etc.) at the transmitter generating the signal to be transmitted by base-station antenna i are all included in the DL compound channel.

Similarly the uplink channel between the k-th user terminal and the i-th base-station antenna is given by $$\overline{y}_{ik} = \overline{h}_{ik} \overline{x}_k + \overline{z}_{ik}$$

where $\overline{x}_k$, $\overline{h}_{ik}$, $\overline{y}_{ik}$, $\overline{z}_{ik}$ denote the transmitted signal from user terminal k, the compound uplink (UL) channel between the two antennas, the observation and noise at the receiver of base-station antenna i, respectively. The amplitude and phase shifts introduced by RF-to-baseband conversion hardware (gain control, filters, mixers, A/D, etc.) at the receiver of base-station antenna i as well as the scalar (complex) coefficient $\overline{t}_k$ contains the amplitude and phase shifts introduced by the baseband-to-RF conversion hardware (amplifiers filters, mixers, A/D, etc.) at the transmitter generating the signal to be transmitted by user terminal k are all included in the compound UL channel.

In the uplink (UL), the following model may be used:

$$\overline{y} = \overline{H} \overline{x} + \overline{z}$$

where $\overline{x}$ is the vector of dimension K×1 (i.e., K rows by 1 column) comprising the user symbols on subcarrier n at symbol time t, $\overline{H}$ is the M×U channel matrix that includes the constant carrier phase shifts and the frequency-dependent constant in time phase shifts due to the relative delays between the timing references of the different terminals, $\overline{y}$ and $\overline{z}$ are the received signal vector and noise at the user terminal.

In the downlink (DL), the following model may be used:

$$\vec{y} = \vec{x} \vec{H} + \vec{z}$$

where $\vec{x}$ is the (row) vector of user symbols on subcarrier n at symbol time t, $\vec{H}$ is the U×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals. Other BSs at sufficiently close distance cause interference as network MIMO/joint transmission/CoMP or any other interference mitigation techniques are not considered. Interference from the other access points is included in the noise term.

Assuming perfect calibration, the compound UL and DL channels become reciprocal, so that $$\bar{H} = \vec{H}$$

For simplicity, the thermal noise is neglected. In order to estimate the downlink channel matrix, the U user terminals send a block of U OFDM symbols, such that the uplink-training phase can be written as $$\overline{Y_{tr}} = \bar{H} \overline{X_{tr}} + \text{noise}$$

where $\overline{X_{tr}}$ is a scaled unitary matrix. Hence, the base-station can obtain the channel matrix estimate $$\overline{Y_{tr}} \overline{X_{tr}} = \bar{H} + \text{noise}$$

In order to perform downlink beamforming, the compound channel downlink matrix $\vec{H}$ is used. The ZFBF precoding matrix is calculated as $$W = \Lambda^{1/2} [\vec{H}^H \vec{H}]^{-1} \vec{H}^H$$

where $\Lambda$ is a diagonal matrix with $\lambda_m$'s as diagonal elements that imposes on each row of the matrix W, the row normalization $\|w_m\|^2 = 1$, for all m.

Hence, the LZFBF precoded signal in the downlink with equal power for each beam also taking account a distance-dependent pathloss model with the diagonal matrix G, whose diagonal elements are $g_i$'s.

$$\vec{y} = \vec{u} p^{1/2} G^{1/2} W H + \vec{z}$$
$$= \vec{u} p^{1/2} G^{1/2} \Lambda^{1/2} [\vec{H}^H \vec{H}]^{-1} \vec{H}^H \vec{H} + \vec{z}$$
$$= \vec{u} p^{1/2} G^{1/2} \Lambda^{1/2} + \vec{z}$$

$$\lambda_k = \frac{1}{\left[ (\vec{H}^H \vec{H})^{-1} \right]_{k,k}}$$

Notice that the resulting channel matrix is diagonal, provided that S≤M.

RRH and Base Station Selection

Embodiments of this invention include protocols and procedures for aggressive uplink pilot reuse across a RRH system or a small-cell network, in conjunction with methods and apparatuses for RRH or cell selection as well as coordination based on the user-proximity detection at the associated RRH sites or small-cell base stations. Embodiments enable large densification benefits to be realized in the DL transmission as well as UL reception of wireless networks. In one embodiment, the disclosed UL pilot reuse protocols also combine the RRH selection based on user-proximity detection mechanisms with acquisition of the user-channels and reciprocity-based DL MIMO transmission. In another embodiment, the same UL pilot reuse protocols and the corresponding RRH selection based on the user-proximity detection mechanisms can also be used for UL data transmission.

System Model

Methods disclosed herein are henceforth described in detail for RRH systems. Similar methods can be straightforwardly applied to networks of small-cells, access points, etc. Without loss of generality, the following scenario involving a center processor (CP) at a macro cell is described, which controls J RRH sites serving multiple active user terminals, as shown in FIG. 2, that is serving a user terminal population based on orthogonal frequency-domain multiplexing access (OFDMA), including multi-carrier FDMA, single-carrier FDMA.

Figure 2:
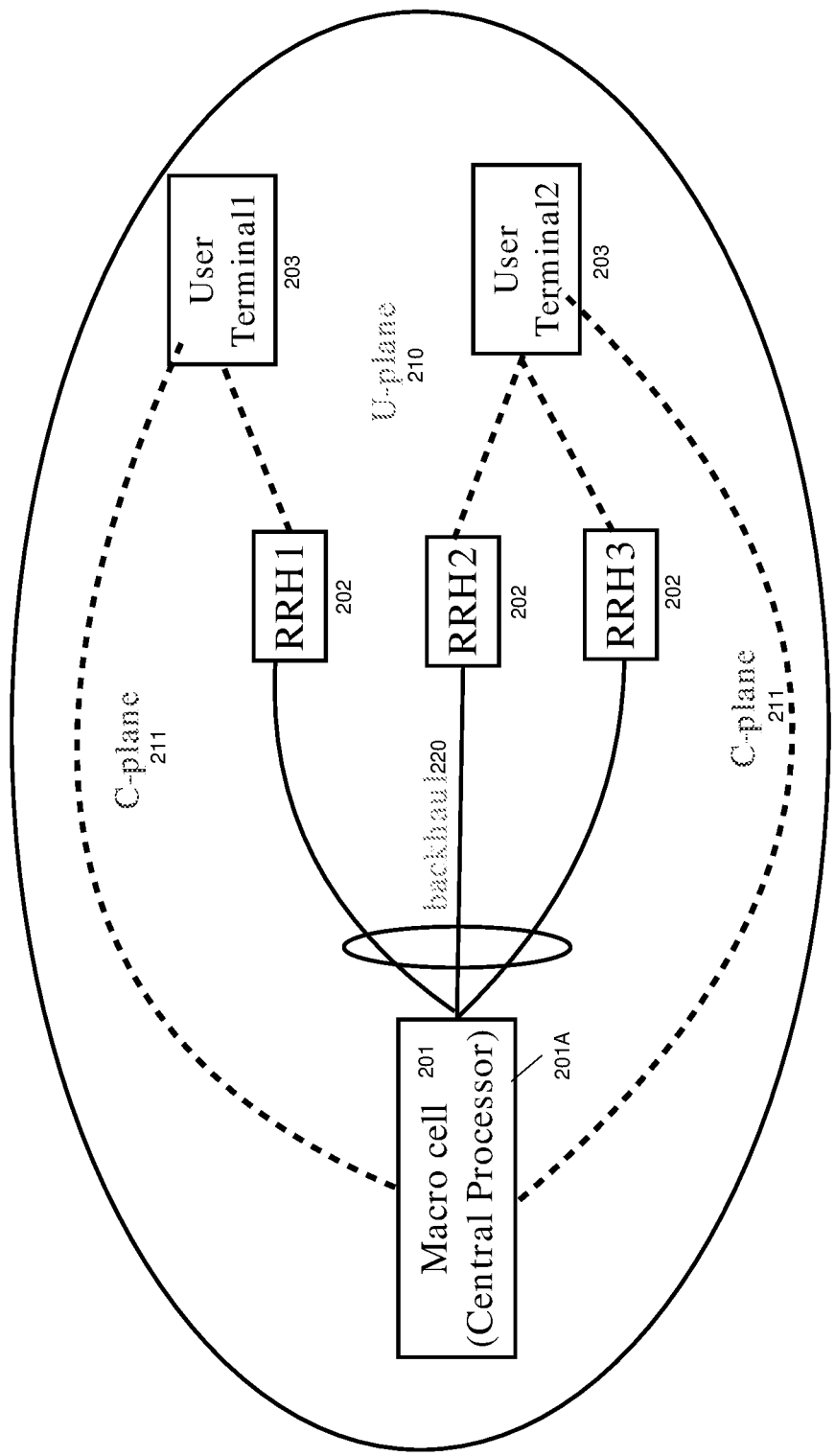
FIG. 2 illustrates a scenario involving a center processor (CP) at a macro cell, controlling J RRH sites serving multiple active user terminals.

Referring to FIG. 2, a central processor 201A of a macrocell 201 is coupled via backhaul 220 to RRHs 202. RRHs 202 may be communicably coupled, via wireless communication, to user terminals 202 via user (U)-plane signals 210. User terminals 203 are also communicably coupled to central processor 201A, via wireless communication, for transmission of the control (C)-plane signals 211.

In one embodiment, the time/spectrum resources are split into resource blocks (RBs), which a block of contiguous subcarriers and symbols. Within each RB, a subset of user terminals across the network are active, i.e., are scheduled for transmission. Without loss of generality, a scheduler operation occurs, according to which the set of active user terminals is the same across several concurrent time slots or OFDM symbols. Although not necessary, to make the treatment concrete, in one embodiment, a block-fading channel model is used where the channel coefficients remain constant within each RB/slot.

In one embodiment, the mmWave bands are used for high-rate data transmission since it offers the promise of orders of magnitude available bandwidth additional to the current LTE-based cellular networks. The much larger number of antennas at the RRH that can be supported in a small footprint at mmWave bands. Even with one or two antennas at the user terminal, the BS with massive MIMO is able to create very sharp beams to the user terminal in proximity, so as to shed more signal power on the desired user terminal and less interference on undesired user terminals.

In one embodiment, the system uses TDD operation which allows each RRH the downlink (DL) channel between its antenna arrays and a user terminal via uplink (UL) pilot transmission procedure within the coherence time period by exploiting the UL/DL channel reciprocity. The uplink pilots are used not only for the RRH selection based on user-proximity detection but also for the estimation of uplink channel quality. It can be extended to FDD operation, where the UL and DL share the same large scale shadowing as well as the channel response in angle of arrival (AoA) angle of departure (AoD), where the disclosed mechanism makes use of the channel reciprocity for the user-proximity-detection-based RRH selection and channel angel estimation.

In addition, the severe increase in path-loss at higher carrier frequency implies the mmWave cell's small coverage. The shorter communication distance results in very few dominant multi-path components in mmWave bands and the channel is sparse. The compressed sensing exploits the channel sparsity and reduces the number of pilot subcarriers per user needed for channel estimation. If the number of multi-paths is S, the required number of pilot subcarriers M is approximated as M=β*S, where β is linear scale, e.g., S=4 and β=5 or 6 for 28 GHz mmWave band. The limited transmit power at each user terminal is boosted on only M non-zero-power pilot REs instead of the whole system bandwidth so as to increase the uplink RS coverage as large as the downlink coverage extended by massive MIMO beamforming. In addition to the M non-zero-power REs, the zero-power REs are added with number of '1' for interference energy detection used in the user-proximity detection. The user terminal's limited Tx power is power boosted on M subcarriers only. With the above design of aggressive pilot reuse, the uplink pilot transmission procedure is applied to Macro-assisted RRH selection in the network as FIGS. 1(a) and (b) with details described in the following embodiments.

A First Example Embodiment

Figure 3:
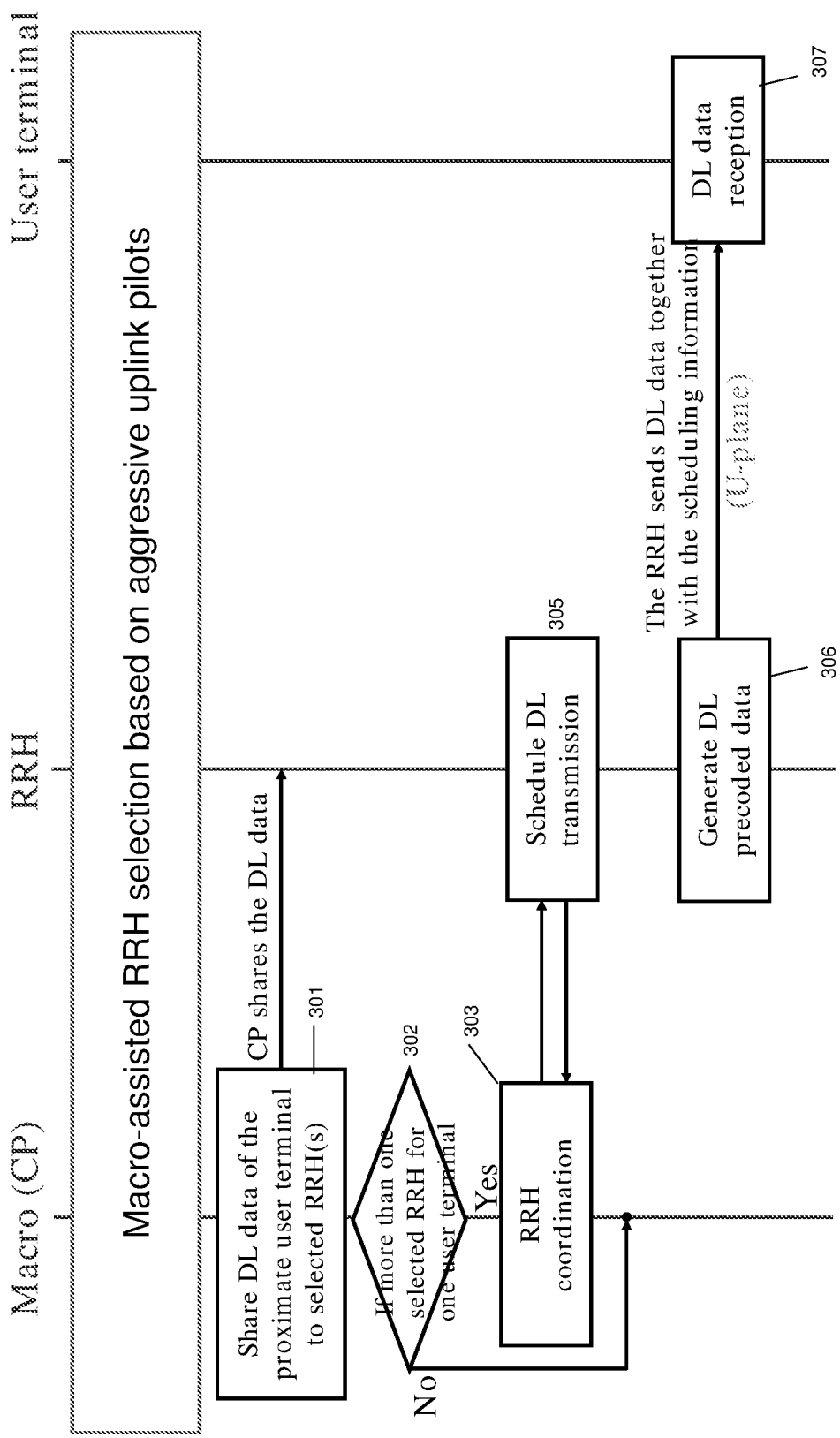
FIG. 3 illustrates directly using the UL sounding-based CSI as the reciprocal DL CSI for downlink data transmission with beam forming.

In one embodiment, the UL pilot-based CSI is directly used as the reciprocal DL CSI for downlink data transmission with beam forming. An example of this is shown in FIG. 3.

Figure 4:
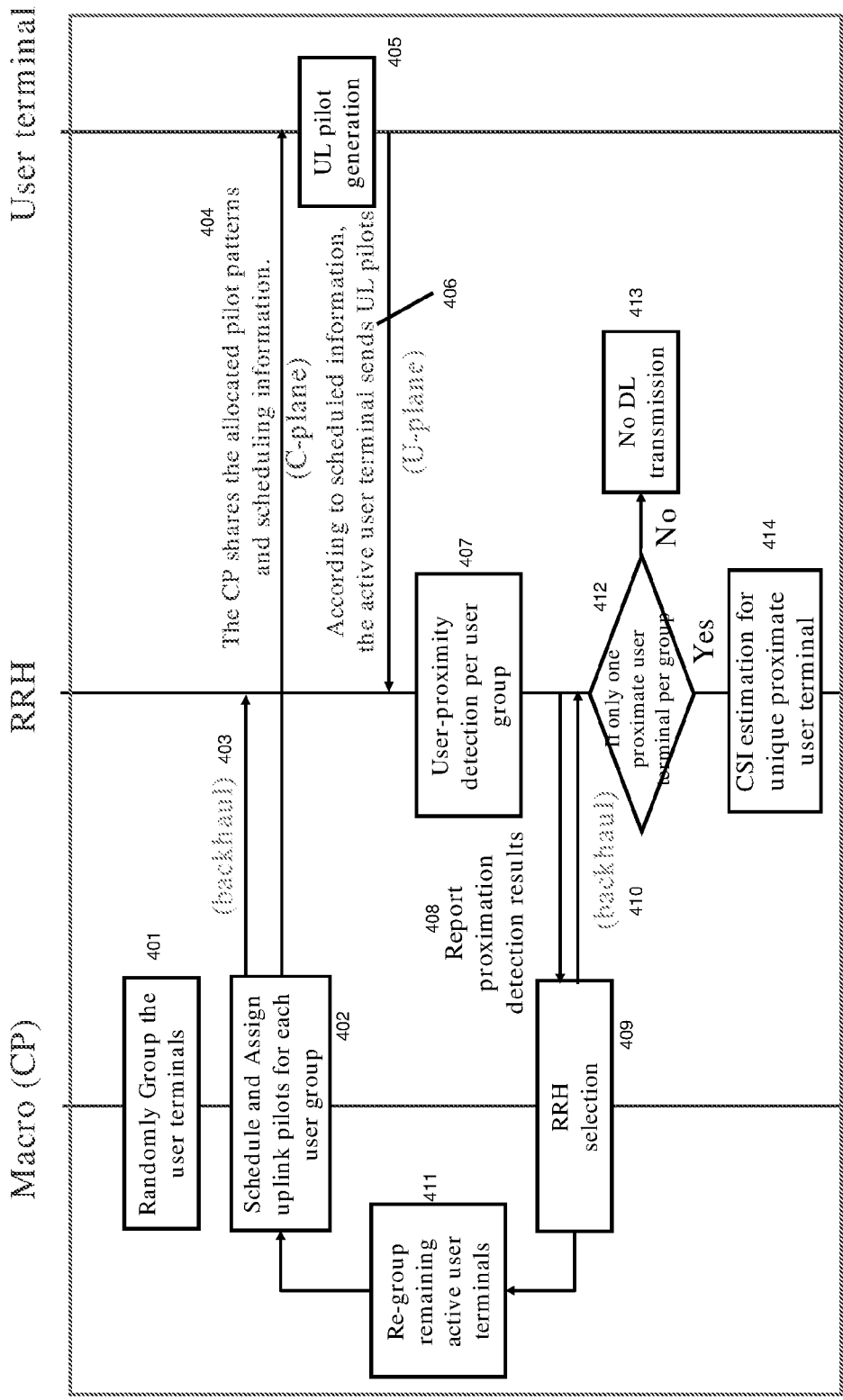
FIG. 4 illustrates a flowchart of one embodiment of macro-assisted RRH selection based on aggressive uplink sounding.

FIG. 4 is a flow chart of Macro-assisted RRH selection based on aggressive uplink pilots. As shown in FIG. 2, the center processor (CP) is located at the macro cell and connected with the RRHs by the backhaul (e.g., an X2 interface). The user terminals are associated with the macro cell and receive/transmit C-plane signals over lower frequency (e.g., $f_c$<5 GHz). The user terminals also receive/transmit U-plane signals from/to at least one of the RRHs over high frequency (e.g., $f_c$>6 GHz), including high-rate data and related reference/control signals. The detailed description of the procedure and mechanisms in flowchart of FIG. 4 is described in more detail below.

After the RRH selection, a user terminal's data from the higher layer will be transferred from the CP over the backhaul to the selected serving RRH or selected multiple cooperating RRHs (with one of RRH is serving RRH, sending control information). There are two options for data sharing:

1) data with selected MCS (modulation and coding scheme)—The MCS is semi-statically selected by CP with no knowledge of the target user terminal's CSI. The CP informs the cooperating RRH(s) about the MCS. In one embodiment, the user terminal is informed of the pre-selected MCS in RRC signaling over C-plane or in the control information over U-plane. The data after modulation and coding or the raw data together with the pre-selected MCS is sent from the CP to the cooperating RRH(s) for the target user terminal; and 2) data without selected MCS Referring to FIG. 3, the raw downlink data before the modulation and coding is shared by the CP with the selected serving or selected cooperating RRH(s) for the target user terminal (301). The modulation and coding scheme (MCS) is not selected by CP but is dynamically selected by its serving cell or cooperating RRH(s). With estimated CSI of the unique proximate user terminal per group, in one embodiment, the RRH generates the precoded downlink data to focus the power on the narrow beam due to the larger number of transmit antennas at RRH side and also reduce the interference to the other user terminals in the downlink. It significantly increases the downlink user multiplexing gain over the same time/frequency resources of the neighbor RRHs. The channel-dependent scheduling is performed at the cooperating RRHs for the target user terminals to decide the illustrated following scheduling information, such as user terminal index, MCS index, subframe index, RB index, stream number and index, etc.

The CP determines if more than one RRH is selected for one user terminal (302). If more than one RRH are selected as the cooperating RRHs for the data transmission of the same proximate user terminal, the RRH coordination is needed for coordinated beamforming/scheduling, dynamic point selection or joint transmission (303). In one embodiment, the CP chooses one RRH dynamically to maximize the user throughput on the scheduled resources for the target user terminal, based on the locally scheduling information at each selected RRH.

In another embodiment, the CP chooses more than one RRHs for simultaneous transmission over synchronized the time/frequency resources (305). The precoding vector as well as the MCS for simultaneous data transmission should also be coordinated based on the locally scheduling information at each selected RRH. The selected serving RRH sends the user terminal about the scheduling information using the control signals on the enhanced physical downlink control channel (ePDCCH) with beamforming and/or PDCCH without beamforming but lower rate or simple repetition (306) which is received by the user terminal (307). Different from the conventional cell selection in LTE, the proposed Macro-assisted RRH selection is transparent to the target user terminal, the scrambling sequence for the data in physical downlink shared channel (PDSCH), control information in PDCCH/ePDCCH may not need to be generated by a pre-assigned cell ID of selected RRH according to the network planning. It can be a cell ID configured by the the CP in the Macro cell for a virtual cell with the transmit power focused on the selected user terminal. The radio network temporary ID (RNTI) used for the scrambling of the CRC for user-specific DCI as well as that for the scrambling sequence of the PDSCH and PDCCH/ePDCCH may be configured by the higher layer and signaled from Macro cell over C-plane, independent of the selected RRH.

Based on the RRH scheduling, the precoded data together with the precoded DM-RS (demodulation RS) is generated by using the same precoding vector achieved from the estimated CSI. If more than one RRH is selected, in one embodiment, a temporary short ID is defined to differentiate each RRH from the selected candidate RRH list for dynamic point selection or joint transmission. For CSI estimation and filtering, the temporary short index of each selected RRH is signaled in the downlink control information (DCI) of PDCCH/ePDCCH to differentiate the RRHs. For example, if {RRH1, RRH2} are selected as the candidate serving cell, RRH1 and RRH2 are dynamically used for downlink transmission. One way is to use 1-bit in DCI to differentiate RRH1 and RRH2 and the target user terminal only averages the CSI from the same RRH. By using 1-bit in DCI or 1-bit in RRC signaling in case of downlink transmission from multiple dynamically selected RRHs, the target user terminal will not average the CSI estimated from the DM-RS from different RRHs. To avoid the dynamic signaling for the selected RRH, in one embodiment, the TDD pattern (e.g., selected RRHs transmit DL data in different symbols or subframes) is semi-statically configured to switch the selected RRH.

Referring to FIG. 4, the macro assisted RRH selection based on aggressive uplink pilots begins with central processor randomly grouping the user terminals (401). Next, the central processor schedules and assigns uplink pilots for each user group (402). The uplink pilot assignment and schedule are sent via backhaul to the RRHs (403). The CP also shares the allocated pilot patterns with scheduling information with the user terminals using the C-plane signals (404). In response to this information, the user terminals perform UL pilot generation (405). According to the schedule information, the active user terminal sends the UL pilots via the U-plane signals (406).

Using received pilot information; the RRHs perform user proximity detection and report the proximity detection results to the central processor (408). In response to the reported proximity detection results, the CP performs RRH selection to select the RRH for each user terminal (409). The CP sends the RRH selections to the RRHs via the backhaul (410). The CP also regroups the remaining active user terminals that are not assigned to an RRH (411) and transitions back to block 402 to schedule and assign uplink pilots for each user terminal group for the next scheduling operation.

The RRHs determine if only one proximate user terminal per group exists for each RRH (412). If not, no DL transmission occurs from an RRH to a user terminal (413). If only one proximate user terminal exists per group, then CSI estimation occurs for the unique proximate user terminal (414).

Another Example Embodiment

Figure 5:
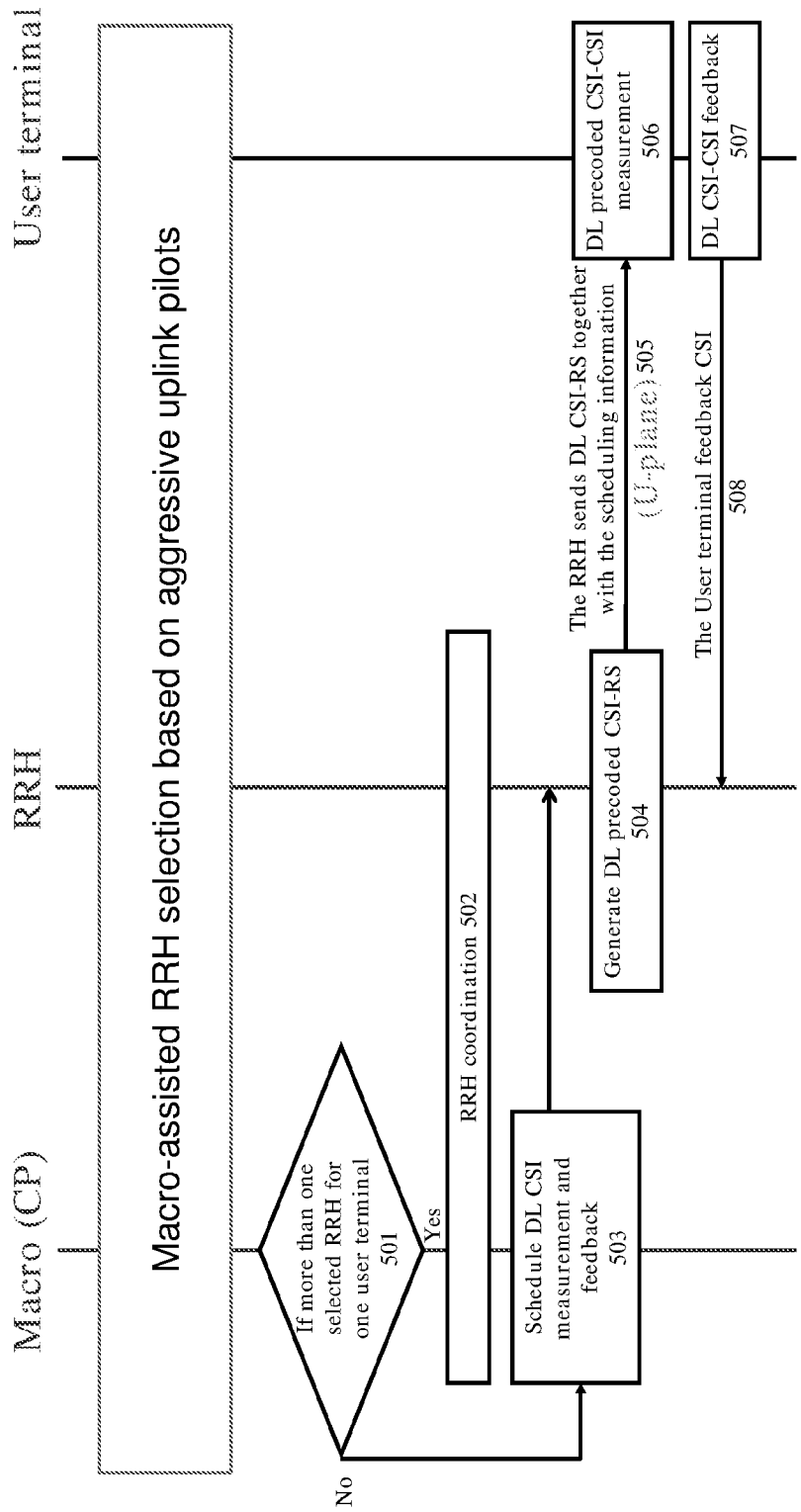
FIG. 5 illustrates using the uplink-sounding-based CSI to generate downlink beamformed (precoded) CSI-RS.

In another embodiment, the UL pilot-based CSI is used to generate downlink beamformed (precoded) CSI-RS. This is illustrated in FIG. 5. Referring to FIG. 5, the CP determines if more than one RRH is selected for the user terminal (501). If so, the CP performs RRH coordination to coordinate the multiple RRHs for a particular user terminal (502). After RRH coordination or if there is only one selected RRH for one user terminal, the CP schedules DL CSI measurements and sends the scheduling information to the RRH. In response to this information, the RRH schedules the downlink CSI measurement and sends feedback back to the CP (503).

Next, the RRH generates DL precoded CSI-RS data (504). The RRH sends the DL CSI-RS together with the scheduling information via U-plane signals to the user terminal (505). In response to this, the user terminal performs a DL precoded CSI-CSI measurement (506), performs a DL CSI-CSI feedback operation (507) and sends the feedback CSI back to the RRH (508).

The detailed description of the procedure and mechanisms in flowchart of FIG. 5 is described in more detail below.

Figure 6:
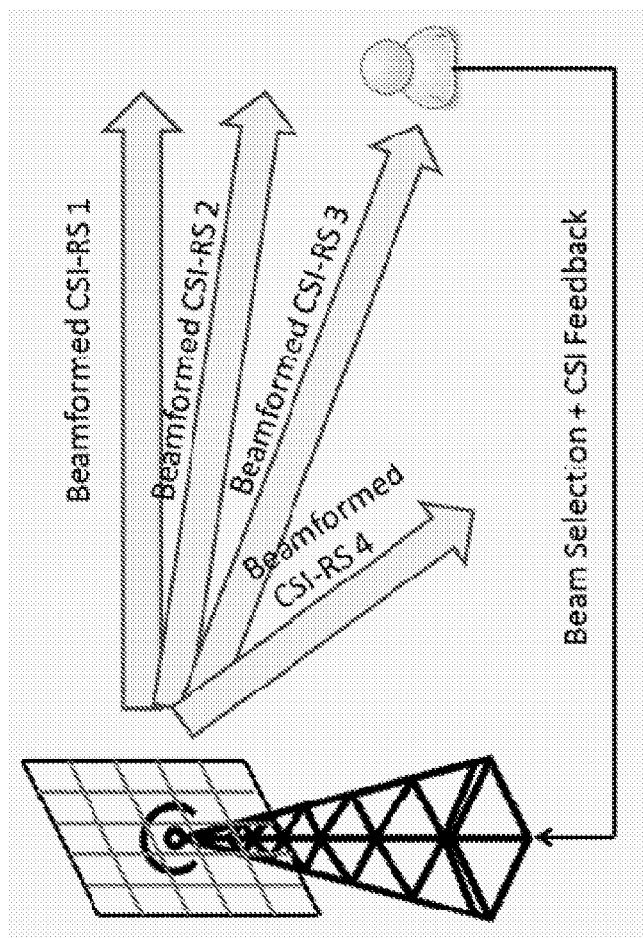
FIG. 6 illustrates beamformed (precoded) CSI-RS

By using the beamformed CSI-RS sent from the selected RRH(s), the user terminal can measure DL CSI on configured CSI-RS resources that are beamformed toward different directions, as shown in FIG. 6, so that the accurate feedback of downlink multi-stream CSI is achieved with reduced overhead.

More specifically, with respect to FIG. 5, the RRH(s) is selected based on uplink pilots as the candidate RRH(s) for beamformed CSI measurement as a measurement set. In one embodiment, based on the estimated precoded CSI-RS, the cooperating RRH(s) for data transmission can be narrowed down to maximize the user throughput with beamformed transmission.

In case of more than one candidate RRH for CSI measurement, the CSI-RS transmission needs to be coordinated by the CP. A temporary special ID (short index) is defined for each candidate RRH for CSI measurement, which is signaled in the downlink control information (DCI) of ePDCCH with beamforming or PDCCH without beamforming but lower coding rate or simple repetition. For example, {RRH1, RRH2} are selected as the candidate serving cell and RRH1 and RRH2 are dynamically used for downlink transmission. One way is to use 1-bit in DCI to differentiate RRH1 and RRH2 and the target user terminal will not average the CSI estimated from the precoded CSI-RS for generate narrower beams from different RRHs. Instead of the above dynamic signaling for the selected RRH, in one embodiment, the TDD pattern (e.g., selected RRHs transmit DL data in different symbols or subframes) is semi-statically configured to switch the selected RRH, where the CP configures the different subframes for the precoded CSI-RS sent from respective RRH.

In one embodiment, within each subframe, the RRH locally schedules the resources and precoding vectors based on the estimated CSI of the proximate user terminals. The channel-dependent scheduling based on UL CSI estimation is performed at each RRH for the target user terminals to determine the scheduling information for DL CSI feedback, such as, for example in one embodiment, the subframe index, RB index, beam number and beam index (or CSI-RS index shown in FIG. 6) per RRH, etc. in DCI of PDCCH/ePDCCH together with the precoded CSI-RS transmission.

As for the corresponding user terminal behavior, the DL precoded CSI from different beams or different RRHs are estimated respectively. Only the CSI from the same beam and the same RRH can be averaged to improve the channel estimation.

Yet Another Example Embodiment

Figure 7:
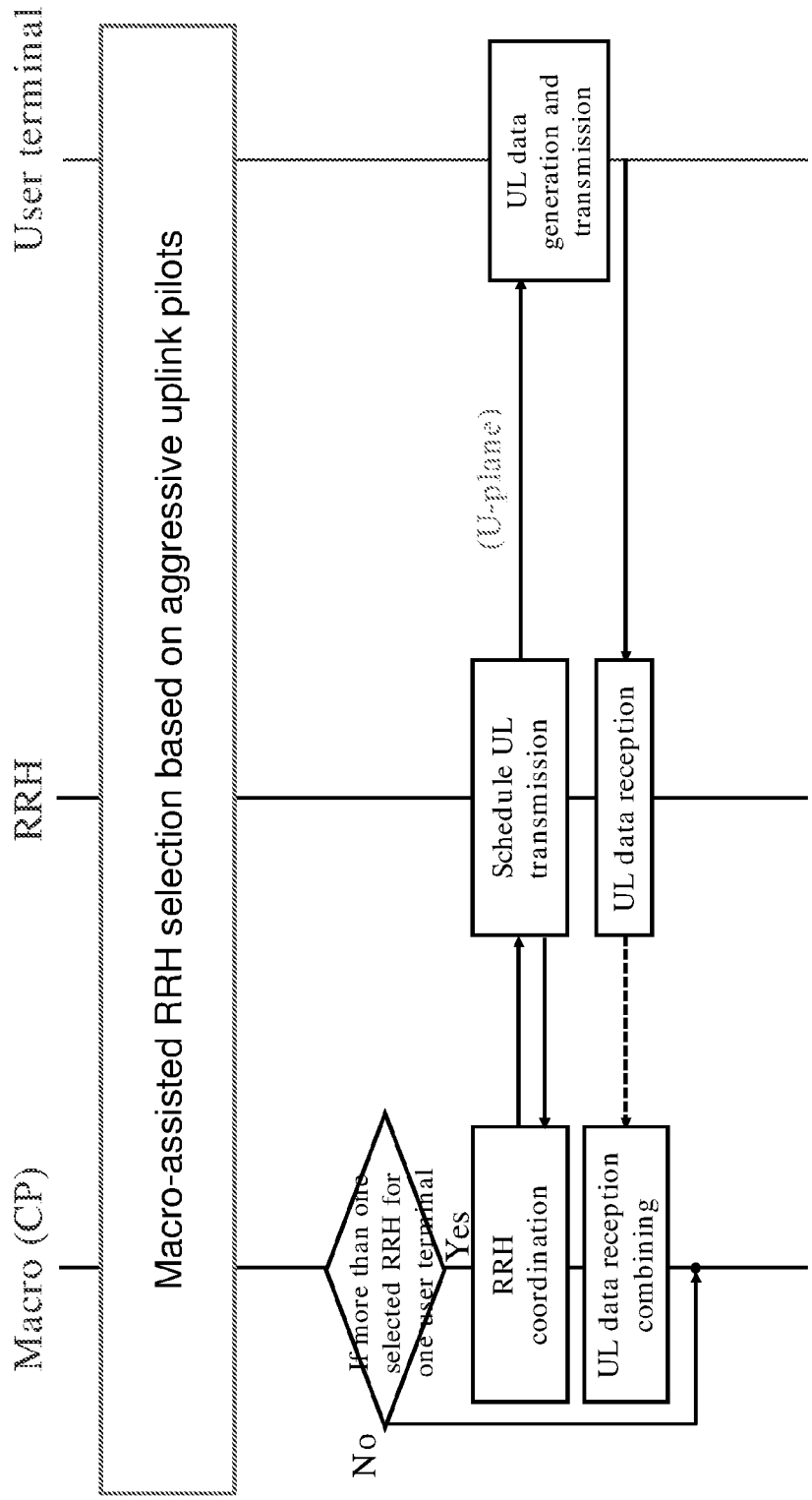
FIG. 7 illustrates applying the macro-assisted RRH selection based on aggressive uplink sounding to UL reception.

Besides the DL transmission as illustrated in FIGS. 3 and 5, in another embodiment, macro-assisted RRH selection based on aggressive uplink pilots is applied to UL reception, as illustrated in FIG. 7. The detailed description of the procedure and mechanisms in flowchart of FIG. 7 is described below.

Based on the estimated UL CSI, in one embodiment, the transmit power at the target user terminal is controlled by tuning to the selected RRH or multiple selected RRH(s) for the sake of power saving as well as interference control. The user terminal transmits the UL data over the physical uplink shared channel (e.g., PUSCH) according to the scheduling information indicated by the ePDCCH with beamforming or PDCCH without beamforming but at a lower rate or repetition from the selected serving RRH in proximity. In one embodiment, the cell ID for the scrambling sequence of PUSCH and PUCCH is not the pre-assigned physical cell ID of the selected RRH; instead, it is a cell ID configured by the Macro cell for a virtual cell with the transmit power focused on the selected user terminal. In one embodiment, the cell ID for PUSCH and PUCCH is different from that in DL. The user-specific RNTI is configured by higher layer and signaled from Macro cell using the C-plane signals, independent of the selected RRH. In case of multiple selected RRH(s) for data reception, the coordinated scheduling to synchronize the resources for UL data transmission is needed and the data locally received at the RRH is transferred to the CP for further combining.

To reduce the data transmission over the backhaul, in one embodiment, the selected RRH(s) locally decode the packet of the user terminal with coordinated interference management instead of combining.

Example Procedures and Mechanisms of Macro-Assisted RRH Selection

Each of the operations in one embodiment of the Macro-assisted RRH selection based on aggressive uplink pilots is described below.

Initial User Grouping at CP

In one embodiment, the configured uplink bandwidth consists of $N_{tot}$ subcarriers, which are divided into $N_{RB}$ RBs with ($N_{tot}/N_{RB}$) subcarriers per RB. Within each set of $N_{RB}$ concurrent RBs, the RRH system schedules a subset of $K_{tot}$ active user terminals with a single antenna for this pilot transmission procedure. The active user terminals and RRH sites are indexed by the indices k and j, respectively, with k from the active user terminal set K={1, 2, . . . , $K_{tot}$} and j in the RRH set J={1, 2, . . . , J}. It is assumed that RRH site j has $M_j$ antennas with $M_j>>1$ over mmWave band.

In one embodiment, there are $K_{tot}$ active user terminals associated with the macro cell and the RRHs. With no knowledge of the channel information between the user terminal and the RRHs, the CP randomly divides the user terminals into G groups and each group consists of K user terminals, where $G \times K >= K_{tot}$. The group of K user terminals are assigned the same resource positions and the group of user terminals send the uplink pilots or reference signals at the same timing based on the scheduling information.

Pilot Configuration at CP

Different from orthogonal pilot patterns, in one embodiment, the user terminals are assigned with non-orthogonal pilot codes with the zero-power and non-zero-power elements, as shown in FIGS. 8(a) and (b). If l=1 in FIG. 8(a), the user terminals have non-overlapped unique zero-power subcarrier positions. For example, user terminal 1 has a zero in the P1 pilot index, while user terminal 2 has a zero in the P2 pilot index, etc. In contrast, if l>1, as illustrated in FIG. 8(b), the user terminals' zero-power subcarrier positions are overlapped. For example, user terminals 1 and 2 both have a zero in the P2 pilot index.

Figure 9:
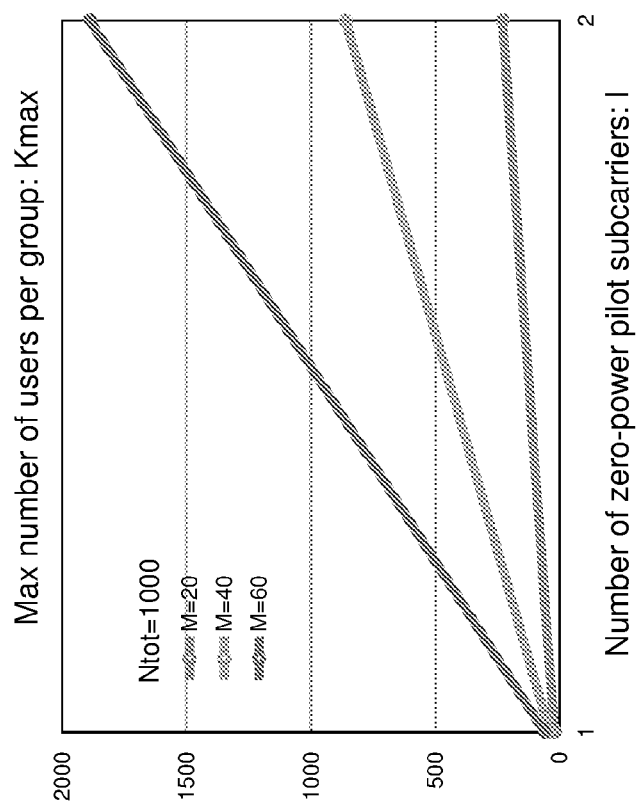
FIG. 9 illustrates the value of $K_{max}$ as a function of the number of zero-power subcarriers l.

Thereafter, by selecting the l resource element positions within (M+l) pilot subcarriers, the maximum number of the multiplexed users are $K_{max}=C(M+l, l)$, where C(x,y) is to select y items from a collection of x. FIG. 9 illustrated the value of $K_{max}$ as a function of the number of zero-power subcarriers l. Larger M increases $K_{max}$ and also results in higher pilot efficiency $\Sigma=M/(M+l)$ since $M>>l$.

The non-orthogonal pilot patterns are assigned to the group of K user terminals, with M non-zero power subcarriers to carry uplink training sequence for channel estimation and l zero-power subcarriers (i.e., subcarrier hole) for interference energy detection. The resource positions are the (M+l) resource elements sparsely distributed within the whole configured bandwidth W. Note that the zero-power and non-zero-power pilot resource may be overlapped in frequency domain but in different symbols. For a target user terminal's point of view, the RRH's received energy on the zero-power pilot resource element position reflects the interference level from the other users in the same group. Only if the interference on the zero-power pilot positions are all low-level (e.g., lower than the pre-defined threshold) but the signal power on the non-zero-power pilot positions are high-level, the RRH can identify the unique target user in proximity.

Figure 10B:
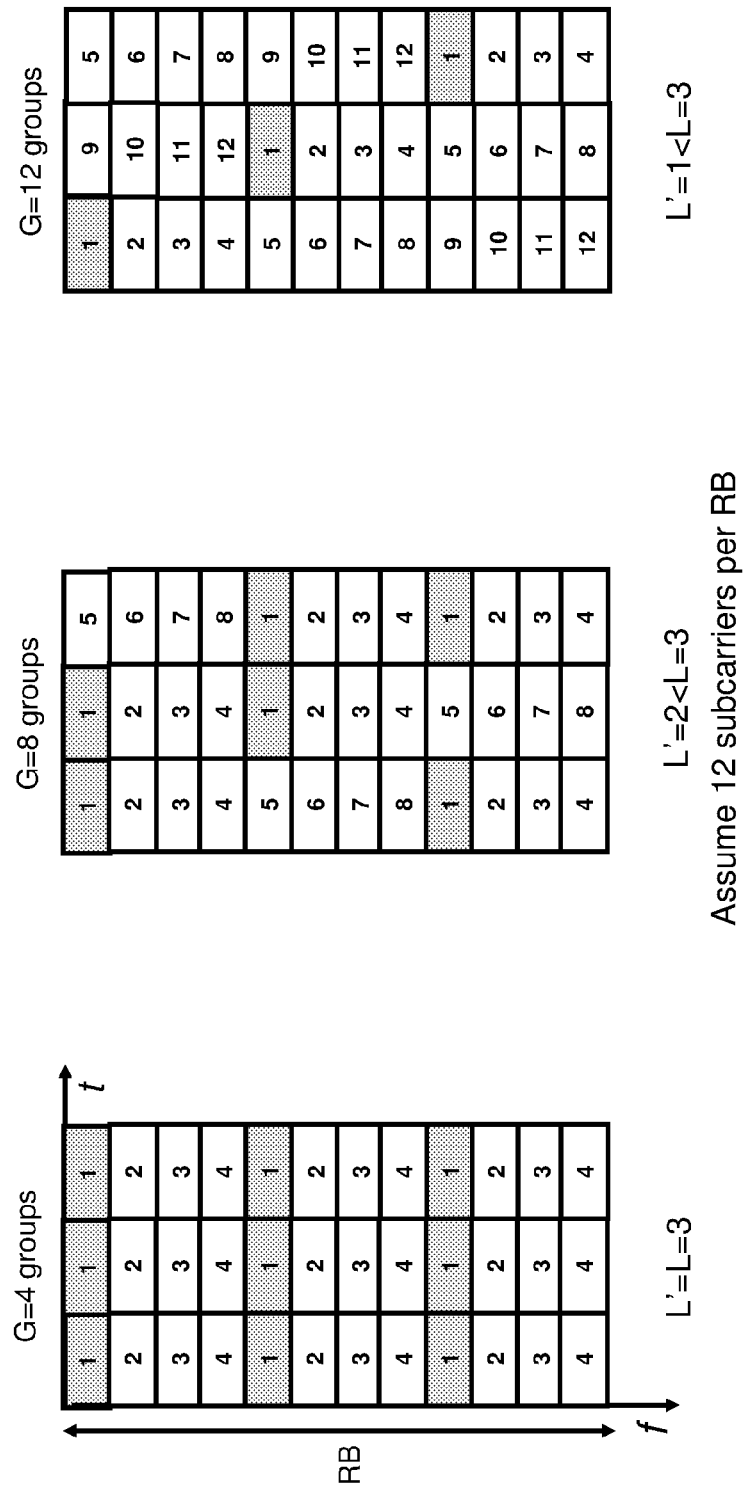
FIG. 10B illustrates orthogonal resources allocated to different groups of user terminals and the resource element marked with group index.

In one embodiment, L subcarriers are equally allocated within each RB with $L=(M+l)/N_{RB}$ and the L subcarriers cover at least one of the $N_{symbol}$ contiguous OFDM symbols configured for the uplink pilots. If there are more than one of the contiguous OFDM symbols for the uplink pilots, as illustrated as FIG. 10(a), where 3 OFDM symbols within coherence time have flat channel variation in the time domain Within one OFDM symbol, there are L' subcarriers with L'<=L. In one embodiment, the time/frequency resource elements in each RB and symbol are grouped and allocated to different groups of user terminals. As illustrated in FIG. 10(b), the orthogonal resources are allocated to different groups of user terminals and the resource elements are marked with group index. If L'=L=3 in every symbol for one group of user terminals, G=4 groups are divided assuming 12 subcarrier per RB. If L'=1, there are max G=12 groups.

Besides the regular type of pilot subcarrier positions within each RB illustrated in As shown, FIGS. 10(a)-(c), in another embodiment, the subcarrier index is generated by using the pseudorandom positions over the configured uplink bandwidth, which is combined with the compressed sensing for channel estimation as described in more detail below. In one embodiment, a random seed to generate a uniformly distributed random number between the subcarrier index range of $[1, N_{tot}]$ over the configured bandwidth is shared among the CP, the RRH and the user terminal to locally generate the same sparsely distributed subcarrier indexes, and the subcarrier indexes for different group are not overlapped.

In various embodiments, each user terminal has single antenna for illustration. Note that it can be extended to the user terminals with multiple antennas. Assume a user terminal with B>1 transmit antennas, one way is to regard each transmit antenna as a different user and allocate the uplink pilot for each transmit antenna in individual group so as to allow the RRH receiver to estimate the channel of up to B streams for the unique proximate user terminal. For example, for the user with B=2 antennas, the pilot resources of the 1st group (marked by '1') are allocated for the 1st transmit antenna and those of the 2nd group (marked by '2') are allocated for the second transmit antenna as in FIG. 10(b). In another embodiment, the user terminal is allowed to use only one of the B transmitter antennas for the uplink pilot transmission, and the CP only allocates the uplink pilots for the user terminal with one transmit antenna. As illustrated in FIG. 10(b), only the pilot resources of the 1st group are allocated to this user terminal. In one embodiment, the CP configures the transmit antenna switching at the user terminal by using a TDD pattern (e.g., selected transmit antennas transmit the pilots in different symbols or subframes). Otherwise, the transmit antenna is selected by the user terminal and in one embodiment, the selected transmitter antenna index is explicitly indicated in the uplink control information (UCI). In one embodiment, considering each transmit antenna at the user terminal share the same large-scale shadowing characteristics, the RRH still averages the received energy over the allocated pilot resources for the user-proximity even if the pilots are sent from different transmit antennas. If the RRH identifies only one user in proximity, the independent CSI from different transmit antennas should be estimated respectively, and cannot be averaged at the RRH receiver.

At the user terminal transmitter, a low-PAPR training sequence with length of ($N_{RB} \times L'$) is sent on the non-zero-power subcarriers within each Ol-DM symbol. The sparse holes on the l zero-power subcarriers may not have big impact on the low PAPR characteristics of the uplink pilot sequence. The training sequence with low PAPR can be binary sequence or non-binary sequence. For the binary sequence, it can be designed based on the basic Barker sequence, Golay sequence or m-sequence, etc., while the non-binary sequence can choose the sequence from the $N_{length} \times N_{length}$ DFT-matrix with $N_{length}=(N_{RB} \times L')$ or Zad-off-chu sequence with length of $N_{length}$ and different cyclic shift.

Transmit Power Configuration

In one embodiment of the macro-assisted RRH systems, the power control for the uplink pilots is configured by the CP without targeting to a fixed RRH. It is different from the conventional LTE power control for uplink pilot, where the power is controlled by the target eNB (serving cell). The u-th user terminal's transmit power on each subframe is set according to the open-loop power control to control the received PSD at each RRH as $$P_{tx}(u)=\min(P_{max}, 10\ \log(L')+10\ \log(N_{RB})+P_o(u)+PL\_coverage) \quad (1)$$

where $P_{max}$ is the maximum power at user terminal, L' is the number of pilot subcarriers per symbol per RB, $N_{RB}$ is the number of RBs allocated for the configured bandwidth, and $P_o(u)$ is the user-specific parameter configured by the higher layer and informed by the CP through C-plane. $P_o(u)$ consists of $P_{o\_norminal}$ and $P_{o\_user}$, and $P_{o\_norminal}$ is a function of nominal target SINR plus noise level together with the noise figure of the RRH RF side, representing the expected received power on each subcarrier at RRH. $P_{o\_user}$ is a user-specific offset configured during the configured time period for flexible control. The conventional path loss (PL) in LTE is measured by the user terminal based on the downlink reference signal sent from the target eNB. Here, however, PL_coverage is the expected coverage of the RRHs set by the CP, which is a function of the RRH coverage distance at U-plane. For sake of simplicity, $P_{tx}(u)$ may have a default value, such as Pmax, in case of no specific configuration information.

In one embodiment, the power on the subcarriers except for those non-zero-power pilot subcarrier positions are all set zero. By selecting smaller L' and NRB, the power is boosted on a limited number of pilot subcarriers. According to the power-controlled transmit power in Eq. (1), the transmit power on non-zero-power pilot subcarriers is set as $$P_{tx}(u,f)=P_{tx}(u)-10\ \log(L'*N_{RB}) \quad (2)$$

If M>>l, the zero-power on the 1 subcarriers in the pilot sequence does not have impact on the AGC at the RF side during the consecutive OFDM symbols for the uplink pilots. But if L'=L, a more accurate transmit power on the non-zero-power pilot subcarriers can be set as Eq. (3) by adding adjusting factor of 10 log(Σ), where the pilot efficiency Σ=M/(M+1).

$$P_{tx}(u)=\min(P_{max}, 10\ \log(L')+10\ \log(N_{RB})+10\ \log(\Sigma)+P_o(u)+PL\_coverage) \quad (3)$$

and the transmit power on non-zero-power pilot subcarriers is set as $$P_{tx}(u,f)=P_{tx}(u)-10\ \log(M) \quad (4)$$

In the dense scenarios, the power control is efficient and necessary for power saving of the battery-motivated user terminals. In one embodiment, the power is set so that the proximate user terminal within the RRH coverage is identified and also the channel estimation on the non-zero-power subcarriers for the unique proximate user terminal if identified is high enough to be robust against the interference and noise.

After the RRH selection, the uplink transmit power at the target user terminal is controlled by tuning to the selected RRH or multiple selected RRH(s) based on the estimated UL CSI for the sake of power saving as well as interference control. The CP informs the remote radio control (RRC) signaling for the open-loop power control configuration, while the serving RRH indicates the close-loop signaling in DCI of PDCCH/ePDCCH.

Threshold Configuration for the User Proximity Detection at a RRH

At each RRH, the average received power across the large number of receive antennas is mainly dependent on the transit power and large-scale shadowing rather than the fast fading in the frequency domain. In one embodiment, the threshold is set so that the proximate user terminal within the RRH coverage is identified. Although the user terminals are not in the RRH coverage, the accumulated interference may raise the level on the zero-power subcarriers of the proximate user terminal. In one embodiment, the threshold level is initialized as 0.5(S+Z+Z), where S+Z is the approximate received power on the non-zero-power subcarrier and Z is that of the zero-power subcarrier. By the power control described above is used, the average received signal S can be approximated as $SINR_{target}*Z$ and therefore, initialized as $Th_{init}=(0.5*SINR+1)*Z$, where $Z=10^{\wedge}(Z\_dB/10)$ and $Z\_dB=NF+N_{AWGN}+I_{derta}$, where NF is the noise figure at the RRH RF receive side and $I_{derta}$ is the relative level against the average AWGN noise across receive antennas raised by interference. Based on the initialized threshold, in one embodiment, the CP increases or decreases the threshold by $Th_{derta}$ informing the threshold based on the user-proximity detection results reported from the RRH.

Instead of the above absolute value for the initialized threshold, in one embodiment, a relative threshold is used. For example, the CP controls the level 'Δ' in dB relative to the highest average received signal to identify the low-energy subcarriers so that $Th=\max\{P_{rx}(f)\}-\Delta$, where $P_{rx}(f)$ is average received signal on the f-th subcarrier and beta can be 3 dB for example.

Too high threshold results in that many RRHs identify no proximate user terminals although there are many active user terminals to be served and vise versa. Based on the reported user-proximity detection results, in one embodiment, the CP adjusts the relative threshold by $Th_{derta}$ adaptive to the user terminal distribution and system traffic load.

Singling Information to RRHs

In one embodiment, the CP sends a set of UL pilot configuration information for every user terminal with following illustrated parameters to each RRH through backhaul.

Parameters

Total Number of total user terminals per group: $K_{tot}$
Number of groups: G
Bandwidth: W and the number of RBs: $N_{RB}$
Number of symbols: $N_{symbol}$
Number of non-zero-power subcarriers: M
Number of zero-power subcarriers: l
Number of subcarriers per RB: L'
Pilot configuration for all user terminals
{Pilot configuration of the u-th user terminal in the g-th group, u=1 . . . K}
  Group index
  User terminal indexes in each group
  Pilot sequence configuration (as described above)
  Index or pattern of zero-power and non-zero-power subcarriers
  Threshold configuration for the user-proximity detection (as described above)
{Periodicity for the g-th group of user terminals, g=1 . . . G}
  In case of periodic pilot transmission: Period and the starting time or subframe index In case of aperiodic or single pilot transmission: RRC signaling but triggered by the pilot transmission request in PDCCH DCI of the current serving RRH (e.g., to re-select RRH for moving user terminals)

Signaling Information to User Terminals

In one embodiment, the CP also sends the sounding configuration information of each user terminal with following illustrated parameters to the corresponding user terminal through C-plane signals.

Parameters
Bandwidth: W and the number of RBs: $N_{RB}$
Number of symbols: $N_{symbol}$
Number of non-zero-power subcarriers: M
Number of zero-power subcarriers: l
Number of subcarriers per RB: L'
Pilot configuration of the u-th user terminal
  Group index
  User terminal index
  Pilot sequence configuration (as described above)
  Index or pattern of zero-power and non-zero-power subcarriers
  Transmit power configuration (as described above)
  Periodicity
    In case of periodic pilot transmission: Period and the starting time or subframe index
    In case of aperiodic or single pilot transmission: RRC signaling but triggered by the sounding request in PDCCH DCI of the current serving RRH (e.g., to re-select RRH for moving user terminals)

RRH Selection at the CP

Based on the reported results of proximate detection from each RRH, the CP makes a decision of the selected RRH(s) for each user terminal and indicates the selected RRH(s) for DL transmission or UL reception.

If the user terminal is the unique proximate user terminal of at least one RRH (i.e., the user terminal is proximate to at least one RRH and no other user terminal is determined to be proximate to the at least one RRH), then the CP has two options:

1) The CP semi-statically selects only one RRH as the serving RRH and informs the selected RRH for DL transmission to the user terminal determined to be proximate to the one RRH. In response to this, the RRH will schedule/transmit DL data to the unique proximate user terminal without the requirement of RRH coordination.

2) If the CP allows more than one RRH to perform simultaneous DL transmission to the user terminal, then the RRH coordination is required at the CP for coordiated multi-point transmission or reception (CoMP).

In one embodiment, if the CP selects more than one RRH to serve the same proximate user terminal, then the CP negotiates the scheduling among multiple RRHs for simultaneous transmission to the same proximate user terminal. In one embodiment, in this case, the CP performs MCS synchronization with the knowledge of a locally selected MCS at each RRH, e.g., to choose the lowest MCS. In another embodiment, the CP performs precoding vector synchronization with the knowledge of precoding vector at each RRH. Thereafter, in both cases, the CP sends the synchronized scheduling information to the RRH(s) to generate the DL data for transmission.

If the user terminal is not in proximity of any RRH, the user terminal has no serving RRH and will be re-grouped.

In one embodiment, if the user terminal is one of the proximate user terminal candidates, the user terminal has no serving RRH and will be re-grouped.

User Grouping Adjustment at CP

Based on the results of RRH selection, the CP re-groups the user terminals with no serving RRH yet. By dividing the proximate user terminals into different groups, they are assigned orthogonal resources as described above to avoid the pilot contamination between each other.

Besides the user regrouping, the CP transfers the user-proximity detection and RRH selection results to the adaptive adjustment of the pilot configuration for system performance improvement. The adaptive adjustments include:

1) adjusting the power control parameters for the users; and
2) adjusting the threshold of proximate detection for the RRHs.

User-Proximity Detection at the RRH

From the CP configuration information, each RRH with multiple parallel digital spatial filters receives the uplink pilot waveforms simultaneously from a group of K user terminals at the scheduled subframe. The designed aggressive pilot reuse pattern allows the j-th RRH to identify the proximate user terminal(s) based on the energy detection on each subcarrier position allocated to the group of K user terminals from the $M_1$ receiver antennas.

In one embodiment, each RRH receives the signal at each receiver antenna on each configured pilot subcarriers per pilot group, and in response thereto, calculates the received signal power by applying a receiver weight for each of the received signals.

Let $y_j[n]=[y_{j,1}[n], y_{j,2}[n], \ldots, y_{j,M_j}[n]]^T$ denote the received signal on the n-th pilot subcarrier by the antenna array at j-th RRH site. Let $I[n]=(|y_{j,1}[n]|^2+|y_{j,2}[n]|^2+ \ldots +|y_{j,M_j}[n]|^2)/M_j$ denote the average received signal energy across the antennas on the n-th pilot subcarrier. For large $M_j$, I[n] is approximately to the same value, only dependent on the large-scale fading but not sensitive to the fast fading on each subcarrier. Because of this fact, in one embodiment, a threshold is compared to the power levels of each pilot subcarrier to identify high or low received power level at each pilot subcarrier. As a result, if I[n] is lower than the pre-decided threshold used for user-proximity detection, the n-th subcarrier is regarded as a zero-power subcarrier. Otherwise, if I[n] is higher than the pre-decided threshold, then the n-th subcarrier is a non-zero-power subcarrier.

According to the hard-decision results, if all the subcarriers have low energy, none of the user terminals are close to the j-th RRH since the received energy is not enough to get accurate channel estimation. For example, if the number of low-level pilot subcarrier within a pilot group is equal to M+1, then no proximate user is identified and thus no DL transmission occurs between the j-th RRH. If the low-energy subcarrier position(s) are exactly the l zero-power subcarrier indexes of the k-th user terminal, the k-th user terminal is identified as the unique proximate user within the j-th RRH coverage. In other words, if the number of low-level pilot subcarrier per group is equal to 1, then the unique proximate user per pilot group is identified as that with the same 'off' pilot subcarrier pattern.

If more than one user terminals is in the proximity of the RRH site j, the number of the low-energy subcarriers will be less than l due to the contamination (pilot collision). In other words, if the number of low-level pilot subcarrier within a pilot group is smaller than l, there are more than one proximate user and then no DL transmission occurs.

In one embodiment, the threshold for user-proximity detection is pre-determined based on the configuration information from CP by using one of the following mechanisms with details above:
1) centralized controlled by the CP; and
2) initially determined by each RRH and adjusted by the CP using RRH-specific parameter(s) such as, for example, average received power Each RRH informs the results of the user-proximity detection to the CP through the backhaul, which in one embodiment is used for RRH selection, user grouping adjustment and user-proximity detection threshold adjustment. The energy detection results include one of the following cases:
1) In case of only one proximate user terminal, each RRH reports at least one of the following information.
   a. the unique proximate user terminal index with the assigned/zero-power subcarrier position(s) same as that(those) of the/subcarrier position(s) with low-energy; and
   b. the l subcarrier position(s)/index(es) with low-energy.
2) In case of more than one proximate user terminal, each RRH reports at least one of the following information:
   a. The proximate user terminal candidate indexes with the assigned l zero-power subcarrier positions overlapped with that(those) of the l' subcarrier position(s) with low-energy; and
   b. the l'<l subcarrier position(s)/index(es) with low-energy.
3) In case of no proximate user terminal, each RRH reports at least one of the following information:
   a. no proximate user terminal; and
   b. the l'>l subcarrier positions/indexes with low-energy Note that the higher threshold of the user-proximity detection results in more subcarriers with low-energy (larger l'), and therefore a higher probability of no proximate user terminal and vise versa. The RRH-reported results assist the CP in controlling the RRH coverage adaptive to the traffic load and user distribution.

CSI Estimation of the Unique Proximate User Terminal at RRH

If the RRHs identify the unique proximate user terminal based on the user-proximity detection, the CP coordinates the RRHs and informs the selected RRH based on the reported user-proximity detection results.

With the knowledge of the pilot configuration of all the user terminals, the RRH locally generates the same training sequence for the proximate user terminal and then estimates the CSI on each receiver antenna. This estimation may be based on zero-forcing (ZF) or MMSE schemes. The channel sparsity is used and the compressed sensing is relied upon to recover the channel over the configured bandwidth by using only M non-zero-power subcarriers. The higher transmit power that is adjusted as described above can help to combat with the AWGN noise so as to improve the channel estimation accuracy if the interference other user terminals in each group is relative smaller due to the significant shadowing in mmWave bands.

Note that the description by the invention can be combined with a broad range of channel estimation algorithms to allow enhancing the channel estimation accuracy based on limited number of non-zero-power uplink pilot transmission. The compressed sensing channel estimation algorithms makes use of the sparse characteristics of the channel response in angle of arrival (AoA) angle of departure (AoD) and multi path spread. The positions of the pilot subcarriers for sparse channel can be pseudorandom allocation over the whole configured bandwidth, where the random seed is shared by the CP.

Note also that if the user terminal has more than one transmit antenna, in one embodiment, the RRH identifies the CSI from different transmit antennas, which is independent and should be processed respectively. The semi-static signaling is indicated in the RRC CP-configured information, such as the subframe index of a TDD pattern, or the dynamic signaling is indicated in the uplink control information (UCI) from the user terminal.

Uplink Pilot Generation at User Terminals

According to the RRH signaling of pilot configuration from the CP as described above, the user terminal gets the pilot configuration as well as the scheduling information according to the scheduling information. The user-specific training sequence is locally generated and mapped on the non-zero-power subcarriers by using the configured transmit power as described above. The user terminal behavior is controlled by the CP. According to the scheduling information, the group of user terminals sharing the same resources transforms the user-specific frequency-domain training sequences into the time-domain pilot waveforms and simultaneously broadcast it to the RRHs at the allocated transmission timing in the periodic or aperiodic ways.

If the user terminal has more than one transmit antenna, the user terminal may select one of the transmit antenna for the uplink pilot transmission. With the knowledge of the selected antenna index, the RRH may further improve the UL CSI estimation from the same transmit antenna, as described above.

Extension of Embodiments

The above illustrated embodiments assume the configuration of one set of UL pilots per user terminal for the user-specific cell configuration. It can be extended to the configuration of more than one set of UL pilots per user terminal to support flexible multi-dimension cell configuration per user terminal.

One example is a user terminal with multiple traffic flows, where the multiple sets of UL pilots per user terminal are used in the network to set up different cell configuration for satisfying different QoS requirement. In one embodiment, the number of UL pilot sets is dependent on the number of flows.

Figure 12A:
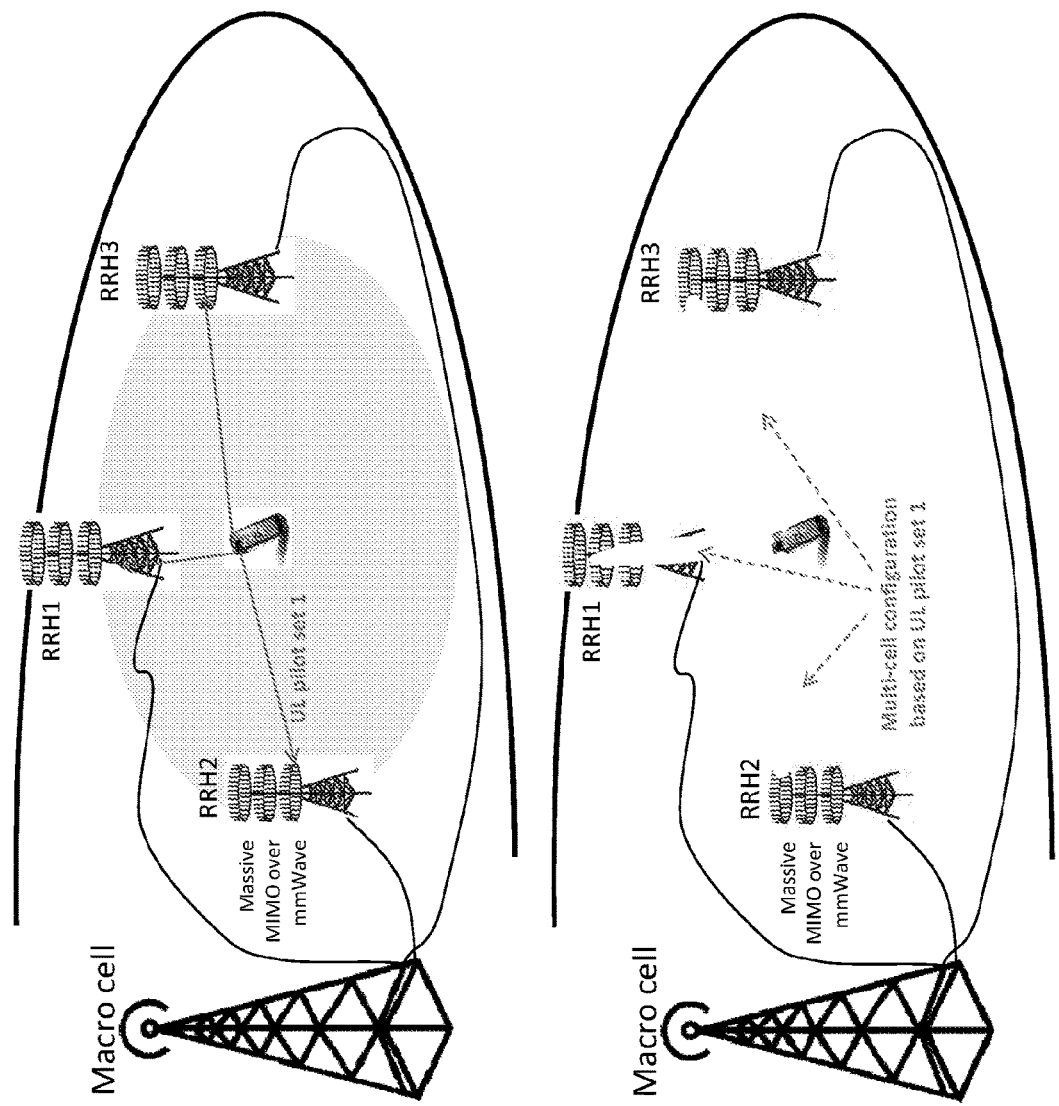
FIG. 12A illustrates the set of UL pilots is configured with higher power and larger UL signal coverage for the flow with high-rate large-packet.

For the flow with high-rate large-packet, such as, for example, video/audio streaming, the set of UL pilots is configured with higher power and larger UL signal coverage, as illustrated in FIG. 12(a). Referring to FIG. 12(a), the UL RS set 1 is transmitted by a user terminal and received by RRHs 1-3. Based on UL RS set 1, the macro cell sets up a multi-cell configuration. Accordingly, multiple RRHs/points/cells are selected to improve the data rate by making use of the spatial diversity and reduce the blockage probability, especially in mmWave bands.

Figure 12B:
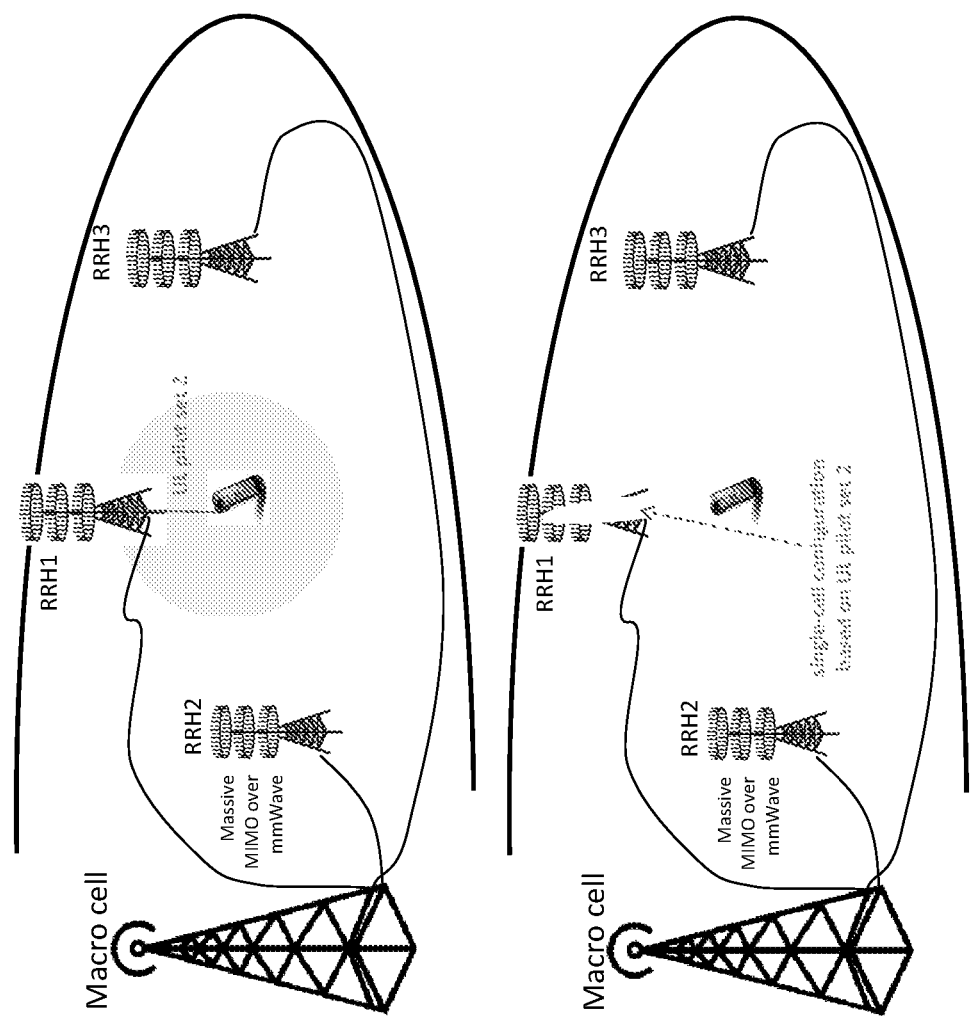
FIG. 12B illustrates the set of UL pilots is configured with low power and limited UL signal coverage for the flow with low-rate small packets.

For the flow with low-rate small packets, such as some real-time and interactive traffic, voice over IP (VoIP) and virtual desktop infrastructure (VDI), the set of UL pilots is configured with low power and limited UL signal coverage as shown in FIG. 12(b), so that single RRH/point/cell is efficient to support simple and fast link adaptation adaptive to the channel condition and error rate requirement. Referring to FIG. 12(b), the UL RS set 2 is transmitted by a user terminal and received by RRH1. Based on UL RS set 2, the macro cell sets a single configuration.

Another example is that a user terminal has multiple antenna ports, where each set of UL pilots is configured for respective antenna port. In one embodiment, the transmission of multiple sets of UL pilots are configured with same power coverage but with different allocated resources. As shown in FIGS. 13(a)-(c), the UL pilot sets cover same subcarriers but are transmitted in different time slots, or on different subcarriers within same time slot, or even with a mixed type. More specifically, in FIG. 13(a), the UL RS set 1 uses the same subcarriers as the UL RS set 2, but they are transmitted at different times, while in FIG. 13(b), the UL RS set 1 uses different subcarriers that the UL RS set 2, but they are transmitted at the same time. FIG. 13(c) illustrates the UL RS set 1 uses different subcarriers as the UL RS set 2 and they are transmitted at different times. The transmission of multiple sets of UL pilot can efficiently reduce the user collision probability by respective grouping each set of UL pilots with those of other user terminals, and/or improve the energy detection accuracy against the fast fading by using spatial diversity.

Figure 11:
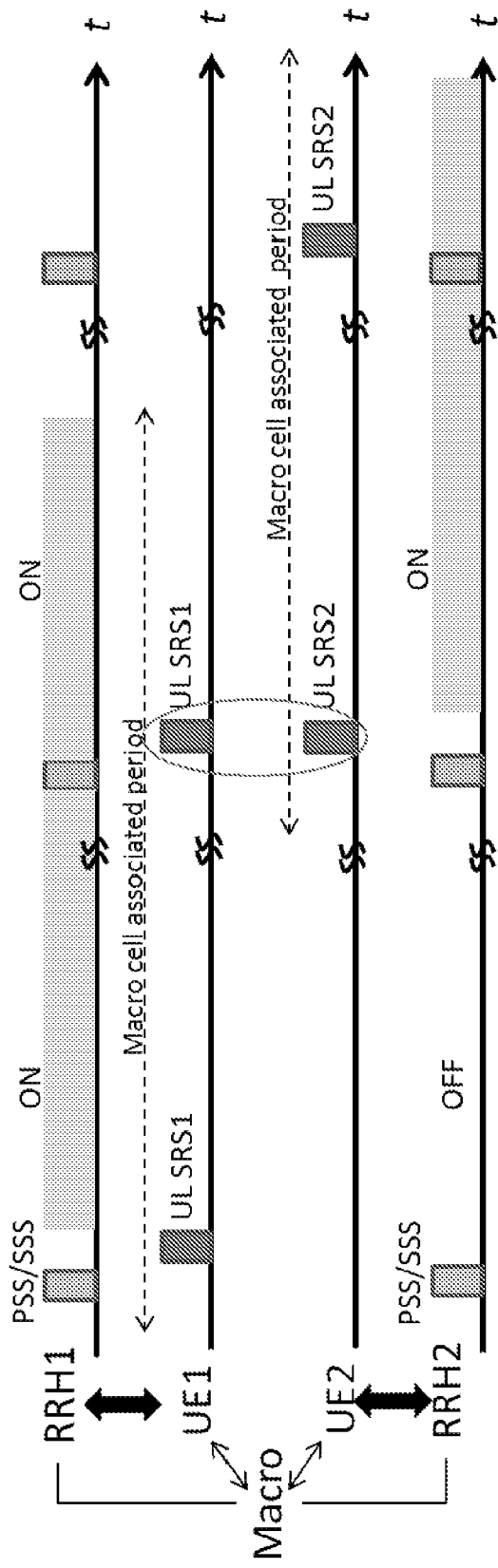
FIG. 11 illustrates an example of UL SRS-based RRH selection.

In one embodiment, instead of DL pilot only DL synchronization signals (PSS/SSS) are used for cell synchronization together with UL user-specific reference signal (SRS) for RRH selection. In this case, the DL PSS/SSS with same PCI is used for RRH synchronization only. After synchronization, user-specific UL SRS is transmitted for RRH selection. Note that each RRH has to report measured received power of every user's SRS to the Macro cell for RRH ranking/selection. This is a lot of information to be sent over the backhaul. FIG. 11 illustrates an example of UL SRS-based RRH selection.

Figure 14:
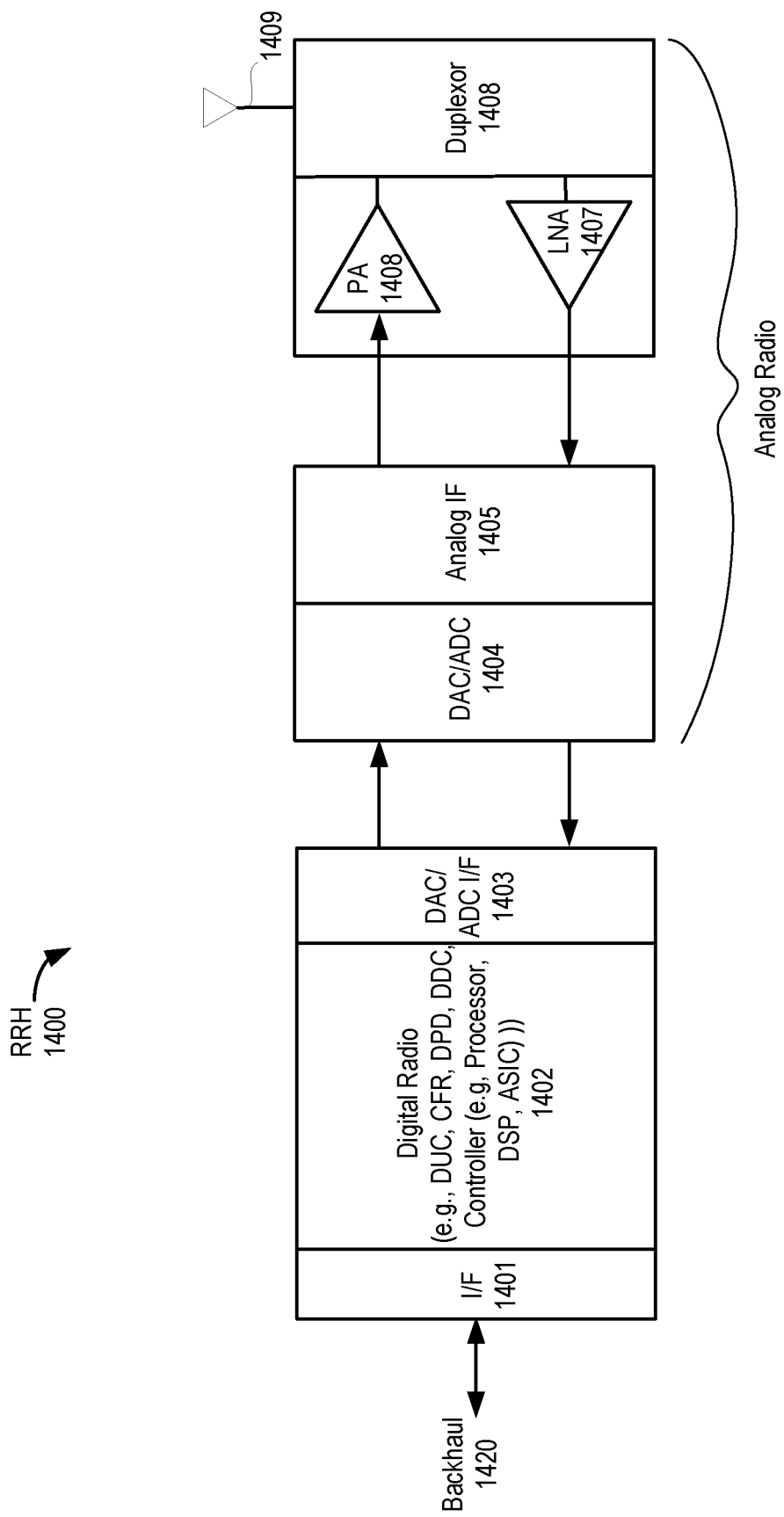
FIG. 14 is a block diagram of one embodiment of a remote radio head (RRH).

FIG. 14 is a block diagram of one embodiment of a remote radio head (RRH) that performs the functions discussed above. Referring to FIG. 14, RRH 1400 comprises a digital radio 1402 with an external interface (I/F) 1401. External interface 1401 interfaces with one or more external communication systems, such as, for example backhaul 1420, which is used to interface to the macro cell (e.g., the macro cell in FIG. 1(a)).

In one embodiment, digital radio 1402 includes a digital up converter (DUC), crest factor reduction (CFR), digital pre-distortion (DPD), digital down conversion (DDC), as well as a controller (e.g., processor, digital signal processor (DSP), and/or ASIC) and other well-known functional components.

Digital radio 1402 includes a digital-to-analog converter (DAC)/analog-to-digital converter (ADC) I/F 1403 that interfaces with an analog radio. The analog radio comprises a digital-to-analog converter (DAC)/analog-to-digital converter (ADC) I/F 1404 coupled to an analog I/F 1405. Analog I/F interfaces to a power amplifier (PA) 1408 and a low noise amplifier (LNA) 1407. PA 1408 and LNA 1407 are coupled to antenna 1409 via a duplexer 1408.

These elements of RRH 1400 are well-known in the art.

Figure 15:
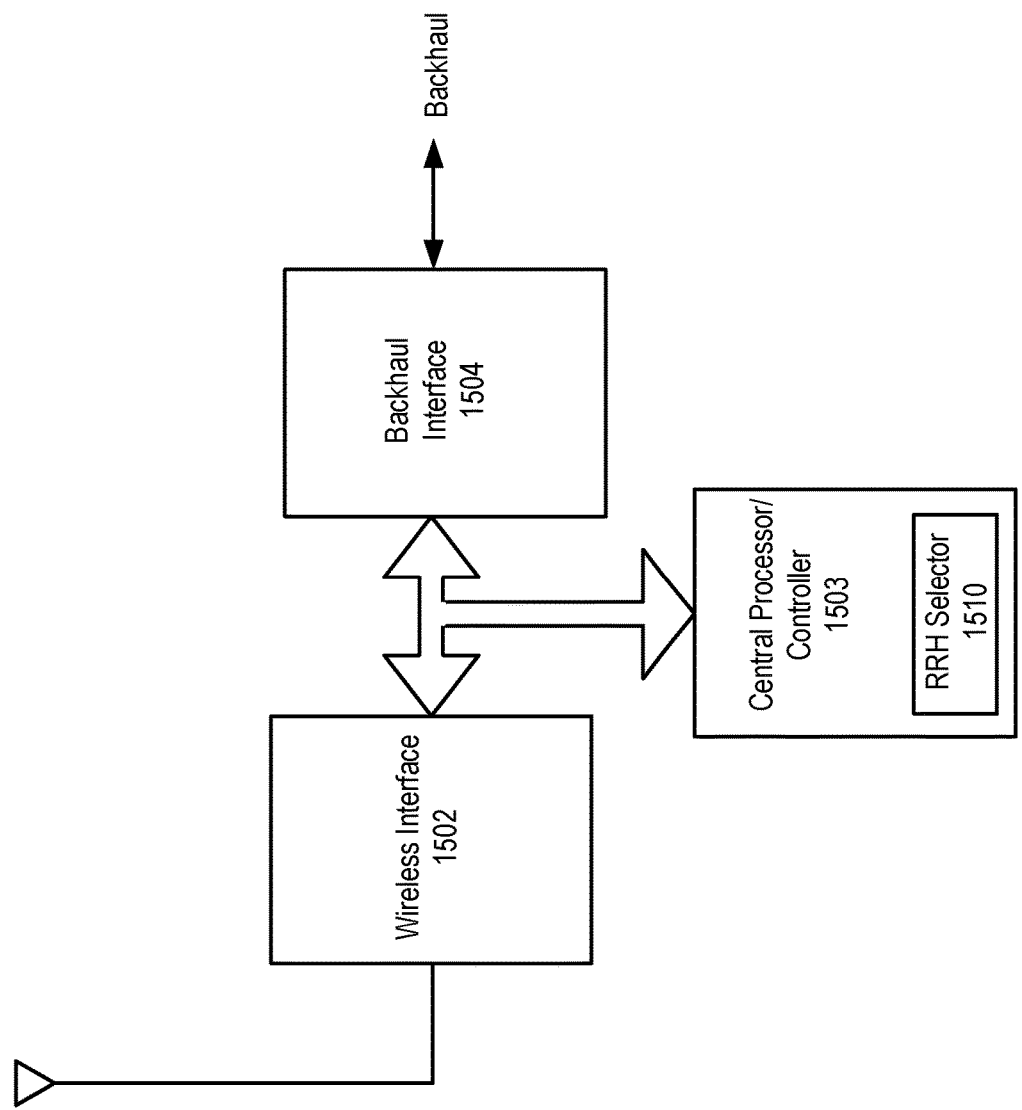
FIG. 15 illustrates a very general block diagram of one embodiment of the macro cell.

FIG. 15 illustrates a very general block diagram of one embodiment of the macro cell that performs functions described above. In one embodiment, this in conjunction with the RRHs may be considered a macro cell base station. In alternative embodiments, this may be considered a base station and perform base station functions itself.

Referring to FIG. 15, the macro cell includes an antenna 1501 coupled to a wireless I/F 1502. In one embodiment, wireless I/F 1502 includes a digital baseband processor, an radio frequency (RF) front-end, a PA, an LNA, a band pass filter (BPF) that operate together to transmit and receive wireless communications, such as, for example, the communications to and from user terminals, via the RRHs.

The macro cell includes a backhaul I/F 1504 to interface with the RRHs in the communication system. A controller/central processor 1503 controls the operations of the macro cell, including those described above. In one embodiment, controller 1503 includes a RRH selector 1510 that performs the selection operation as described above. RRH selector may be implemented in hardware (e.g., circuitry, dedicated logic, etc.), software, firmware, or a combination of the three.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    performing uplink pilot configuration for a plurality of user terminals over a set of common resource elements, including generating a plurality of pilot patterns for the plurality of user terminals, where each of the plurality of pilot patterns comprises at least one zero-power resource element and at least one non-zero-power resource element and at least one zero-power resource element allocated to each different one of the plurality of user terminals has a different position in the pilot pattern; and
    receiving proximity detection results from a plurality of remote radio heads (RRHs) in response to the plurality of RRHs performing user terminal proximity detection based on received uplink pilots sent by the plurality of user terminals based on the uplink pilot configuration.

2. The method in claim 1 further comprising sending a set of parameters associated with the uplink pilot configuration to the user terminals for uplink pilot transmission and to a plurality of remote radio heads (RRHs) for uplink pilot reception.

3. The method defined in claim 2 wherein the set of parameters comprises pilot patterns and scheduling information.

4. The method defined in claim 1 further comprising:
    selecting one RRH of the plurality of RRHs for downlink transmission to one user terminal of the plurality of user terminals, the one user terminal determined to be a single proximate user terminal to the one RRH based on results of proximity detection performed by the one RRH.

5. The method defined in claim 1 further comprising:
    selecting a group of RRHs of the plurality of RRHs for simultaneous downlink transmission to one user terminal of the plurality of user terminals, the one user terminal determined to be proximate to RRHs in the group of RRHs based on results of proximity detection performed by the RRHs in the group.

6. The method defined in claim 5 further comprising negotiating a scheduling among the RRHs in the group for simultaneous transmission to the one user terminal.

7. The method defined in claim 1 further comprising grouping user terminals of the plurality of user terminals in groups; and assigning identical resource positions to user terminals in each of the groups.

8. The method defined in claim 1 further comprising:
    performing, by at least one RRH, user terminal proximity detection based on uplink pilot reception; and
    identifying one or more user terminals of the plurality of user terminals in proximity to the at least one RRH based on received uplink pilots and information associated with the uplink pilot configuration.

9. The method defined in claim 8 wherein identifying one or more user terminals of the plurality of user terminals in proximity to the at least one RRH comprises sending identification information identifying one user terminal that is determined to be the only proximate user terminal to the at least one RRH.

10. The method defined in claim 8 wherein performing user terminal proximity detection comprises:
    receiving a signal at each receiver antenna on each pilot subcarrier per pilot group;
    calculating received signal power at each receiver antenna;
    identifying a high or low received power level at each pilot subcarrier using a threshold;
    determining the one user terminal is the only proximate user terminal is a number of low received power level pilot subcarriers equals 1; and
    determining that no one user terminal is the only proximate user terminal if the number of low received power level pilot subcarriers equals other than 1.

11. The method defined in claim 8 wherein calculating received signal power comprises averaging received signal power of all receiver antennas for a RRH.

12. The method defined in claim 8 further comprising, reporting, by the at least one RRH, results of the user-proximity detection to a central processor for RRH selection to identify the RRH(s) for transmission with a user terminal if the user terminal is determined to be in proximity to the at least one RRH based on the user terminal proximity detection.

13. The method defined in claim 1 wherein the uplink pilot configuration comprises a plurality of sets of uplink pilot configurations, and further comprising selecting one of the plurality of sets of uplink pilot configurations for use based on quality of service (QOS) requirements.

14. The method defined in claim 1 wherein the uplink pilot configuration comprises a plurality of sets of uplink pilots that cover identical subcarriers transmitted in different time slots, different subcarriers transmitted on identical time slots, or a mixture of identical and different subcarriers transmitted in identical and different time slots.

15. A wireless communication network comprising:
    a macro cell having one or more processors;
    a plurality of remote radio heads (RRHs); and
    a plurality of user terminals,
    wherein the one or more processors to perform uplink pilot configuration for the plurality of user terminals over a set of common resource elements, and further wherein the one or more processors are operable to generate a plurality of pilot patterns for the plurality of user terminals, where each of the plurality of pilot patterns comprises at least one zero-power resource element and at least one non-zero-power resource element and at least one zero-power resource element allocated to each different one of the plurality of user terminals has a different position in the pilot pattern, and wherein the one or more processors are operable to receive proximity detection results from the plurality of RRHs in response to the plurality of RRHs performing user terminal proximity detection based on received uplink pilots sent by the plurality of user terminals based on the uplink pilot configuration.

16. The wireless communication network in claim 15 wherein the macro cell is operable to send a set of parameters associated with the uplink pilot configuration to the user terminals for uplink pilot transmission and to the RRHs for uplink pilot reception.

17. The wireless communication network defined in claim 16 wherein the set of parameters comprises pilot patterns and scheduling information.

18. The wireless communication network defined in claim 15 wherein the one or more processors is operable to:
select one RRH of the plurality of RRHs for downlink transmission to one user terminal of the plurality of user terminals, the one user terminal determined to be a single proximate user terminal to the one RRH based on results of proximity detection performed by the one RRH.

19. The wireless communication network defined in claim 15 wherein the one or more processors is operable to:
select a group of RRHs of the plurality of RRHs for simultaneous downlink transmission to one user terminal of the plurality of user terminals, the one user terminal determined to be proximate to RRHs in the group of RRHs based on results of proximity detection performed by the RRHs in the group.

20. The wireless communication network defined in claim 19 wherein the macro cell is operable to negotiation a schedule among the RRHs in the group for simultaneous transmission to the one user terminal.

21. The wireless communication network defined in claim 15 wherein the macro cell is operable to group user terminals of the plurality of user terminals in groups; and assigning identical resource positions to user terminals in each of the groups.

22. The wireless communication network defined in claim 15 wherein each RRH in the plurality of RRHs is operable to:
perform user terminal proximity detection based on uplink pilot reception; and
identify one or more user terminals of the plurality of user terminals in proximity to said each RRH based on received uplink pilots and information associated with the uplink pilot configuration.

23. The wireless communication network defined in claim 22 wherein said each RRH is operable to send to the macro cell identification information identifying one user terminal that is determined to be the only proximate user terminal to the at least one RRH.

24. The wireless communication network defined in claim 22 wherein said each RRH is operable to perform user terminal proximity detection by:
receiving a signal at each receiver antenna on each pilot subcarrier per pilot group;
calculating received signal power at each receiver antenna;
identifying a high or low received power level at each pilot subcarrier using a threshold;
determining the one user terminal is the only proximate user terminal is a number of low received power level pilot subcarriers equals 1; and
determining that no one user terminal is the only proximate user terminal if the number of low received power level pilot subcarriers equals other than 1.

25. The wireless communication network defined in claim 22 wherein calculating received signal power comprises averaging received signal power of all receiver antennas for a RRH.

26. The wireless communication network defined in claim 22 wherein said each RRH is operable to report results of the user-proximity detection to a central processor of the macro cell for RRH selection to identify the RRH(s) for transmission with a user terminal if the user terminal is determined to be in proximity to the at least one RRH based on the user terminal proximity detection.

27. The wireless communication network defined in claim 15 wherein the uplink pilot configuration comprises a plurality of sets of uplink pilot configurations, and further wherein the one or more processors of the macro cell is operable to select one of the plurality of sets of uplink pilot configurations for use based on quality of service (QOS) requirements.

28. The wireless communication network defined in claim 15 wherein the uplink pilot configuration comprises a plurality of sets of uplink pilots that cover identical subcarriers transmitted in different time slots, different subcarriers transmitted on identical time slots, or a mixture of identical and different subcarriers transmitted in identical and different time slots.

29. A non-statutory computer readable storage medium that stores instructions, which when executed on a wireless communication system, causes the system to perform a method comprising:
performing uplink pilot configuration for a plurality of user terminals over a set of common resource elements, including generating a plurality of pilot patterns for the plurality of user terminals, where each of the plurality of pilot patterns comprises at least one zero-power resource element and at least one non-zero-power resource element and at least one zero-power resource element allocated to each different one of the plurality of user terminals has a different position in the pilot pattern; and
receiving proximity detection results from a plurality of RRHs in response to the plurality of RRHs performing user terminal proximity detection based on received uplink pilots sent by the plurality of user terminals based on the uplink pilot configuration; and
selecting one RRH of the plurality of RRHs for downlink transmission to one user terminal of the plurality of user terminals, the one user terminal determined to be a single proximate user terminal to the one RRH based on results of proximity detection performed by the one RRH.

30. The non-statutory computer readable storage medium defined in claim 29 wherein the method further comprises:
performing, by at least one RRH, user terminal proximity detection based on uplink pilot reception; and
identifying one or more user terminals of the plurality of user terminals in proximity to the at least one RRH based on received uplink pilots and information associated with the uplink pilot configuration.

* * * * *